United States Patent
Deng et al.

(10) Patent No.: US 10,549,846 B2
(45) Date of Patent: Feb. 4, 2020

(54) UAV WITH TRANSFORMABLE ARMS

(71) Applicant: SZ DJI TECHNOLOGY Co., Ltd, Shenzhen (CN)

(72) Inventors: Yumian Deng, Shenzhen (CN); Wenlong Xiao, Shenzhen (CN); Yongsheng Zhang, Shenzhen (CN); Liang Sun, Shenzhen (CN); Xingyuan Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 464 days.

(21) Appl. No.: 15/439,854

(22) Filed: Feb. 22, 2017

(65) Prior Publication Data

US 2017/0217571 A1    Aug. 3, 2017

Related U.S. Application Data

(63) Continuation of application No. PCT/CN2016/072879, filed on Jan. 29, 2016.

(51) Int. Cl.
*B64C 25/10* (2006.01)
*B64C 25/52* (2006.01)
(Continued)

(52) U.S. Cl.
CPC .............. *B64C 25/10* (2013.01); *B64C 25/52* (2013.01); *B64C 39/024* (2013.01);
(Continued)

(58) Field of Classification Search
CPC ........ B64C 25/10; B64C 25/20; B64C 25/32; B64C 25/52; B64C 2201/18; B64C 2201/187
See application file for complete search history.

(56) References Cited

U.S. PATENT DOCUMENTS

2014/0034775 A1    2/2014 Hutson
2014/0263823 A1*   9/2014 Wang ................. B64C 39/028
                                                  244/17.23

FOREIGN PATENT DOCUMENTS

CN    203461110 U    3/2014
CN    104648667 A    5/2015
(Continued)

OTHER PUBLICATIONS

Aykelinchayev. AeroQuad: Your Friendly Neighborhood Quadcopter Platform. A build tutorial. Oct. 22, 2010.
(Continued)

*Primary Examiner* — Nicholas McFall
(74) *Attorney, Agent, or Firm* — Anova Law Group, PLLC

(57) ABSTRACT

Aerial vehicles are provided with one or more transformable arms (110, 310, 410, 510, 910). The one or more transformable arms (110, 310, 410, 510, 910) may support one or more propulsion units, and transform between a flight configuration where the propulsion units of the arms effect flight of the aerial vehicle, and a landing configuration, wherein the transformable arms (110, 310, 410, 510, 910) are used as a landing support that bears weight of the aerial vehicle when the aerial vehicle is not in flight. Using the transformable arms (110, 310, 410, 510, 910) as legs when the UAV is in a landed state permits the UAV to reduce weight and reduce obstruction to a payload carried by the UAV when the UA is in flight.

17 Claims, 12 Drawing Sheets

(51) Int. Cl.
*B64C 39/02* (2006.01)
*G05D 1/00* (2006.01)

(52) U.S. Cl.
CPC ...... *G05D 1/0011* (2013.01); *B64C 2201/108* (2013.01); *B64C 2201/18* (2013.01)

(56) References Cited

FOREIGN PATENT DOCUMENTS

| | | |
|---|---|---|
| CN | 105034729 A | 11/2015 |
| CN | 205381395 U | 7/2016 |
| GB | 2483881 A | 3/2012 |

OTHER PUBLICATIONS

International search report and written opinion dated Oct. 24, 2016 for PCT Application No. PCT/CN2016/072879.

\* cited by examiner

US 10,549,846 B2

UAV WITH TRANSFORMABLE ARMS

CROSS-REFERENCE

This application is a continuation application of International Application No. PCT/CN2016/072879, filed on Jan. 29, 2016, the content of which is hereby incorporated by reference in its entirety.

BACKGROUND OF THE INVENTION

Aerial vehicles, such as unmanned aerial vehicles (UAV) typically use landing gears to assist with landing for safety purposes. However, while the aerial vehicles are in flight, the landing gears are an increased weight to be borne by the aerial vehicle, which leads to decreased fuel efficiency, decreased duration of flight, or obstruction of view of a payload carried by the aerial vehicle.

Many aerial vehicles use retractable landing gears. However, the use of retractable landing gears complicates the structure of the aerial vehicles and still remains an increased weight to be carried by the aerial vehicle. Furthermore, when retractable landing gears malfunction, the aerial vehicles may not be able to properly land. Some aerial vehicles use fixed landing gears, which are less complex, but that can obstruct view of a payload of an aerial vehicle.

SUMMARY OF THE INVENTION

A need exists for improved landing systems and methods for aerial vehicles, such as unmanned aerial vehicles (UAVs). The landing systems may incorporate transformable arms of the aerial vehicle. The transformable arms may transform between arms that support propulsion units that may generate lift for the aerial vehicle when the aerial vehicle is in flight, and legs that support weight of the aerial vehicle when the aerial vehicle is not in flight. By utilizing existing arms that are used to aid in flight of the aerial vehicles as legs, the overall weight of the aerial vehicle is reduced, since separate landing gears are not required. Reducing the weight of the aerial vehicle allows for greater fuel efficiency and/or flight duration of the aerial vehicle. Further, this arrangement also reduces or prevents obstruction of view of a payload carried by the aerial vehicle, due to any landing gears. The overall structure of the aerial vehicle may be simplified.

An aspect of the invention is directed to an unmanned aerial vehicle (UAV) comprising: a central body; and a plurality of arms extending from the central body, each arm of said plurality supporting one or more propulsion units that provide lift while the UAV is in flight, wherein a first subset of the plurality of arms is configured to function as a landing support that bears weight of the UAV while the UAV is not in flight, and wherein a second subset of the plurality of arms is configured to not bear weight of the UAV while the UAV is not in flight.

An additional aspect of the invention is directed to a method for unmanned aerial vehicle (UAV) operation, said method comprising: supporting one or more propulsion units on each of a plurality of arms extending from a central body, wherein the one or more propulsion units provide lift to the UAV while the UAV is in flight; and bearing weight of the UAV while the UAV is not in flight, with aid of a first subset of the plurality of arms is configured to function as a landing support, and not with a second subset of the plurality of arms that is not configured to function as a landing support.

An unmanned aerial vehicle (UAV) is provided in a further aspect of the invention, the UAV comprising: a central body; and a plurality of arms extending from the central body, each arm of said plurality supporting one or more propulsion units, wherein at least one of the plurality of arms is configured to transform between (1) a flight configuration that provides lift while the UAV is in flight and (2) a landing configuration wherein the at least one arm is configured to function as a landing support that bears weight of the UAV while the UAV is not in flight, wherein the at least one arm comprises a first section coupled to the central body and a second section coupled to the one or more propulsion units, and wherein at least one of the first section or the second section are configured to change orientation relative to one another.

Moreover, aspects of the invention are directed to a method for unmanned aerial vehicle (UAV) operation, said method comprising: supporting one or more propulsion units on each of a plurality of arms extending from a central body; and transforming at least one of the plurality of arms between (1) a flight configuration that provides lift while the UAV is in flight and (2) a landing configuration wherein the at least one arm is configured to function as a landing support that bears weight of the UAV while the UAV is not in flight, wherein the at least one arm comprises a first section coupled to the central body and a second section coupled to the one or more propulsion units, and wherein at least one of the first section or the second section are configured to change orientation relative to one another.

Further aspects of the invention are directed to an unmanned aerial vehicle (UAV) comprising: a central body; a plurality of arms extending from the central body, each arm of said plurality supporting one or more propulsion units, wherein at least one of the plurality of arms is configured to transform between (1) a flight configuration that provides lift while the UAV is in flight and (2) a landing configuration wherein the at least one arm is configured to function as a landing support that bears weight of the UAV while the UAV is not in flight, and wherein an orientation, relative to the central body, of one or more propulsion units supported by the at least one arm is different between the flight configuration and the landing configuration.

In accordance with some aspects of the invention, a method for unmanned aerial vehicle (UAV) operation may be provided, said method comprising: supporting one or more propulsion units on each of a plurality of arms extending from a central body; and transforming at least one of the plurality of arms between (1) a flight configuration that provides lift while the UAV is in flight and (2) a landing configuration wherein the at least one arm is configured to function as a landing support that bears weight of the UAV while the UAV is not in flight, wherein an orientation, relative to the central body, of one or more propulsion units supported by the at least one arm is different between the flight configuration and the landing configuration.

Additionally, aspects of the invention may be directed to an unmanned aerial vehicle (UAV) comprising: a central body; and a plurality of arms extending from the central body, each arm of said plurality supporting one or more propulsion units, wherein at least one of the plurality of arms is configured to transform between (1) a flight configuration that provides lift while the UAV is in flight and (2) a landing configuration wherein the at least one arm is configured to function as a landing support that bears weight of the UAV while the UAV is not in flight, and wherein the one or more plurality of arms is configured to transform between the flight configuration and the landing configuration in response to operation of the one or more propulsion units.

An aspect of the invention may be directed to a method for unmanned aerial vehicle (UAV) operation, said method comprising: supporting one or more propulsion units on each of a plurality of arms extending from a central body; and transforming at least one of the plurality of arms between (1) a flight configuration that provides lift while the UAV is in flight and (2) a landing configuration wherein the at least one arm is configured to function as a landing support that bears weight of the UAV while the UAV is not in flight, wherein the one or more plurality of arms is configured to transform between the flight configuration and the landing configuration in response to operation of the one or more propulsion units.

It shall be understood that different aspects of the invention may be appreciated individually, collectively, or in combination with each other. Various aspects of the invention described herein may be applied to any of the particular applications set forth below or for any other types of movable objects. Any description herein of an aerial vehicle may apply to and be used for any movable object, such as any vehicle. Additionally, the devices and methods disclosed herein in the context of aerial motion (e.g., flight) may also be applied in the context of other types of motion, such as movement on the ground or on water, underwater motion, or motion in space.

Other objects and features of the invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference in its entirety.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Systems and methods are provided for aerial vehicle landing and flight. An aerial vehicle, such as an unmanned aerial vehicle (UAV) may include one or more arms that support one or more propulsion units that generate lift for the aerial vehicle. Any description herein of a UAV may apply to any type of aerial vehicle or movable object, or vice versa. One or more of the arms may be transformable between a flight configuration where the arm functions as an arm to provide lift for the UAV, and a landing configuration where the arm functions as a landing support that bears weight of the UAV when the UAV is not in flight. Using the existing arms as landing supports permits the UAV to take off and land with little or no extra weight added. This may permit a UAV to have increased energy efficiency compared to having a separate landing gear. Having an increased energy efficiency may allow the UAV to have a greater flight duration, compared to having a separate landing gear.

The transformable arms may cause at least a portion of the arm to be raised when the UAV is in flight, and the portion of the arm to be lowered when the UAV is resting on a surface. The raising of the at least portion of the arm may prevent the arm from being an obstruction of one or more payloads carried by the UAV. For example, the UAV may carry a camera, and at least a portion of the arm may be raised during flight to not be caught in the field of view of the camera. When the UAV is landing, the at least portion of the arm may come down to function as a landing support, when obstruction to a field of view of a camera is less of an issue.

Optionally, one or more of the UAV arms may be transformable while one or more of the UAV arms are not transformable. The arms that are not transformable may support propulsion units that may provide lift for the UAV. The arms that do not transform may provide stability and/or effect flight of the UAV while the transformable arms are transforming.

In some implementations, the transformation of the arms may be driven by forces that naturally occur on the arms. For instance, a portion of an arm may be raised due to a lift force generated by one or more propulsion units supported by the portion of the arm. The portion of the arm may be lowered due to a force of gravity. In some instances, one or more mechanical forces may impose a bias on a portion of an arm to be raised or lowered. Optionally, one or more actuators may aid in the transformation of the arms.

Figure 1:
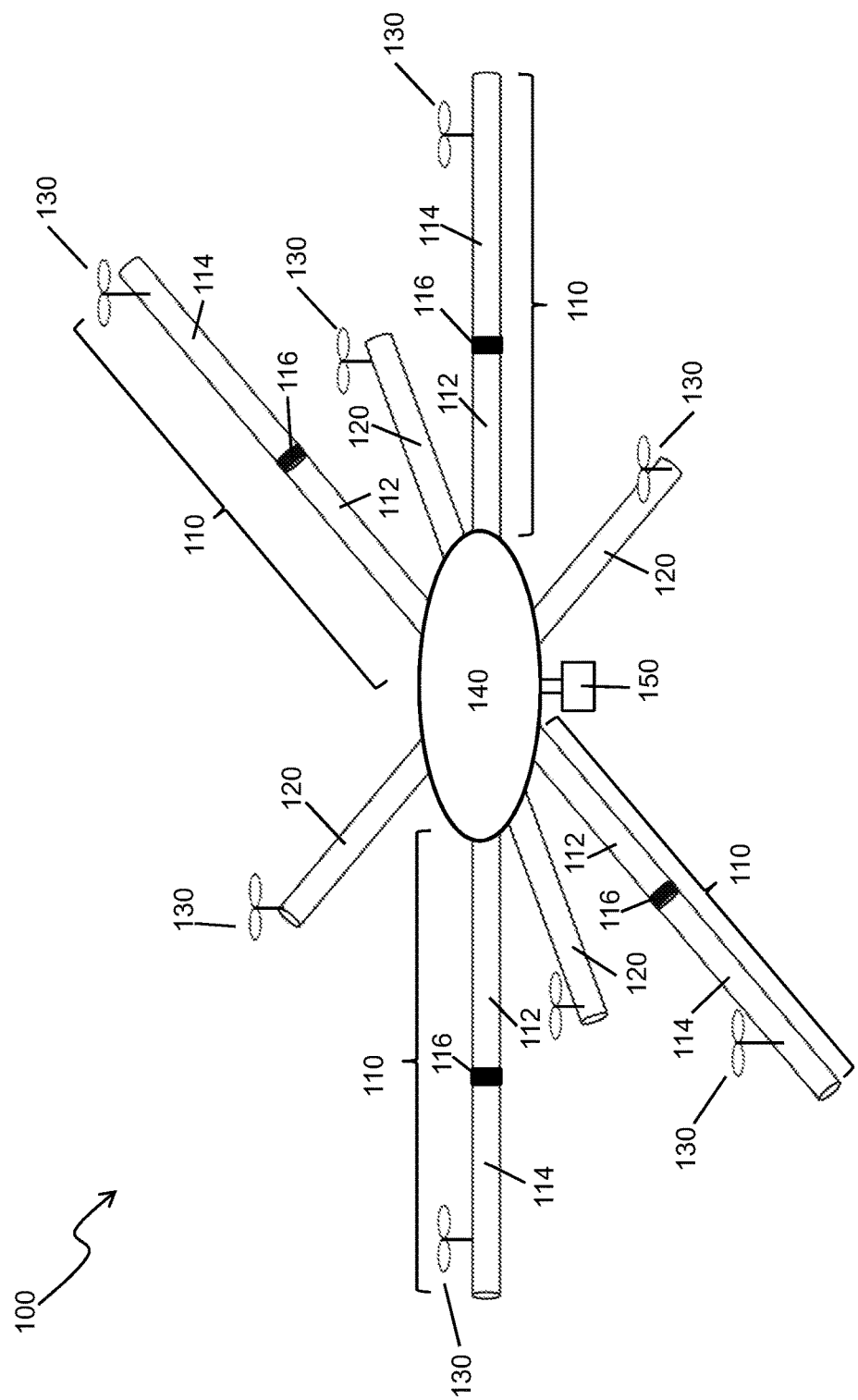
FIG. 1 shows a schematic view of an unmanned aerial vehicle (UAV) having a plurality of arms, including arms that configured to function as a landing support when the UAV is not in flight, in accordance with embodiments of the invention.

FIG. 1 shows a schematic view of a UAV having a plurality of arms, including arms that configured to function as a landing support when the UAV is not in flight, in accordance with embodiments of the invention. The UAV 100 may include one or more arms 110, 120 supporting one or more propulsion units 130. One or more of the arms may be an assistant arm 110 capable of transforming into a leg to bear weight of the UAV when the UAV is landed. One or more of the arms may be a main arm 120 which does not transform into a leg. Optionally, assistant arms may include a first section 112 and a second section 114 which may be movable relative to one another. A joint 116 may be provided between the first section and the second section. The arms may optionally extend from a UAV body 140. The UAV may carry a payload 150.

The UAV 100 may include one or more arms 110, 120. The arms may have an elongated configuration. In some embodiments, each of the arms may be an elongated arm. An elongated arm may have a length that is greater than a cross-sectional dimension. The length of the elongated arm may be at least 1.5×, 2×, 3×, 4×, 5×, 7×, or 10× the cross-sectional dimension. The arms may or may not have sections that branch out. The UAV may have any number of arms. For instance, the UAV may have one or more, two or more, three or more, four or more, five or more, six or more, seven or more, eight or more, ten or more, twelve or more, fifteen or more, twenty or more, thirty or more, forty or more, or fifty or more arms. The arms may optionally extend radially from a central body 140. The arms may be arranged symmetrically about a plane intersecting the central body of the UAV. Alternatively, the arms may be arranged symmetrically in a radial fashion. The arms may be evenly spaced apart. For instance, if N arms are provided for the UAV, the number of degrees between each arm may be 360/N. Alternatively, the arms need not be evenly spaced apart. In some instances, none of the arms are parallel to one another. Alternatively, arms may be arranged so that two or more, three or more, or four or more of the arms may be substantially parallel to one another. All of the arms may be coplanar. Alternatively, one or more types of arms may be coplanar (e.g., main arms may be coplanar with one another, assistant arms may be coplanar with one another). In some embodiments, two or more of the arms may not be coplanar.

One or more of the arms may support one or more propulsion units 130 that may affect flight of the UAV. In some embodiments, each arm may support one or more propulsion units. Alternatively, one or more of the arms may not support a propulsion unit. In some instances, each arm may support one or more, two or more, three or more, four or more, five or more, or ten or more propulsion units. Each arm may support the same number of propulsion units. Alternatively, different arms may support different numbers of propulsion units.

Propulsion units may be configured to generate lift for the UAV. A propulsion unit may include a rotor assembly. A rotor assembly may include one or more rotor blades that may rotate to generate lift for the UAV. In some instances, a plurality of rotor blades may be provided for a propulsion unit. The plurality of rotor blades may or may not be movable relative to one another. The rotor assembly may include an actuator driving rotation of the rotor blades. The actuator may be coupled to the one or more rotor blades with aid of a shaft. Rotation of the actuator may cause rotation of the shaft, which may in turn cause rotation of the rotor blades. Any description of a shaft may also apply to multiple shafts that may be driven by the same actuator. The actuator may be driven by electrical energy, magnetic energy, thermal energy, mechanical energy, hydraulic pressure, or pneumatic pressure. The actuator may be a motor. In some embodiments, examples of the actuator may include self-commutated or externally commutated motors. Motors may include mechanical-commutator motors, electronic-commutator motors, synchronous machines, and/or asynchronous machines. Electric motors may include AC or DC motors. Some examples of motors may include direct-drive motors, step-less motors, or servomotors. The motors may be configured to rotate in a single direction, or may be capable of reversing direction. The rotor blades of each of the propulsion units of the UAV may turn, such that a first subset of the propulsion units have rotor blades rotating in a first direction and a second subset of the propulsion units have rotor blades rotating in a second direction, as described in greater detail elsewhere herein. Alternatively, the rotor blades may rotate in the same direction. Propulsion units may or may not include a protective covering that may be provided around at least a portion of the rotor blades.

In some embodiments, propulsion units may be located at or near a distal end of the arms. In some embodiments, arms may be coupled to a central body at a proximal end, and may have a distal end extending away from the central body. One or more of the propulsion units supported by the arm may be supported at a location along a length of the arm within 50%, 40%, 30%, 25%, 20%, 15%, 10%, 5%, 3%, or 1% of the distal end of the arm. In some embodiments, all of the propulsion units supported by the arm may be supported at a location along a length of the arm within 50%, 40%, 30%, 25%, 20%, 15%, 10%, 5%, 3%, or 1% of the distal end of the arm. One or more, or all, of the propulsion units supported by the arm may within 30 cm, 20 cm, 15 cm, 10 cm, 7 cm, 5 cm, 4 cm, 3 cm, 2 cm, 1 cm, 5 mm, or 1 mm of the distal end of the arm. Optionally, one or more of the arms may have a distal portion that extends at least 50 cm, 40 cm, 30 cm, 20 cm, 15 cm, 10 cm, 7 cm, 5 cm, 4 cm, 3 cm, 2 cm, or 1 cm, beyond a length of the arm supported by the one or more propulsion units. Optionally, each arm may have propulsion units located within the same percentage or distance relative to the distal end of the arm. Alternatively, different arms may have propulsion units located at different percentages or distances relative to the distal end of the arm.

The propulsion units may be substantially located on an upper surface of the arms. The upper surface of the arms may be a surface of the arm opposing a lower surface of the arms, wherein the lower surface of the arms are facing a direction of gravity. The upper surface of the arms may be facing away from the direction of gravity. Alternatively, the propulsion units may be substantially located on a lower surface of the arms, on both the upper and lower surface of the arms, within an arm, or any combination thereof. In one example, one or more rotor blades of a propulsion unit may be located above an upper surface of an arm. Alternatively, one or more rotor blades of a propulsion unit may be located below a lower surface of the arm. In some instances, at least one rotor blade of a propulsion unit may be located above an upper surface of an arm while at least one rotor blade of the propulsion unit may be located below a lower surface of the arm. In some instances, an actuator of a propulsion unit may be located above an upper surface of an arm, below a lower surface of an arm, or within an arm. For instance, an actuator may be at least partially located within a cavity of the arm. The actuator may or may not partially extend above an upper surface of an arm and/or below a lower surface of the arm.

The propulsion units supported by the one or more arms may have the same configurations and/or dimensions. Alternatively, they may have different configurations and/or dimensions. In some instances, some of the propulsion units may have larger rotor blades than other propulsion units. The rotor blades may have the same shape or different shapes. The rotor blades of the propulsion units may rotate at the same rate, or may rotate at differing rates.

One or more of the arms may be an assistant arm 110 capable of transforming into a leg to bear weight of the UAV when the UAV is landed. The leg may function as a landing gear configured to contact an underlying surface of the UAV when the UAV is not in flight. Optionally, assistant arms may include a first section 112 and a second section 114 which may be movable relative to one another. The first section may be a section of the assistant arm proximal to a UAV body. The second section may be a section of the assistant arm distal to the UAV body. The first section may be closer to the central body than the second section.

The first section may or may not directly contact the UAV body. The first section may be integrally formed with the UAV body. The first section may be affixed or attached to the UAV body. The first section may or may not be removable relative to the UAV body. The first section may have a fixed position (e.g., orientation, spatial location) relative to the UAV body. Alternatively, the first section may be movable relative to the UAV body.

The second section may not directly contact the UAV body. The weight of the second section may be borne by the first section. The first section may support the second section. The second section may or may not be removable relative to the first section. The second section may have a variable position (e.g., orientation, spatial location) relative to the UAV body. For instance, an orientation of the second section may change relative to the UAV body. The second section may have a variable position relative to the first section. For instance, an orientation of the second section may change relative to an orientation of the first section. Any orientation of the second section may change (e.g., relative to an inertial reference frame, the UAV body, the first section) by any number of degrees, such as at least 1 degree, 3 degrees, 5 degrees, 10 degrees, 15 degrees, 20 degrees, 30 degrees, 45 degrees, 60 degrees, 75 degrees, 85 degrees, 90 degrees, 95 degrees, 105 degrees, 120 degrees, 135 degrees, 150 degrees, or 165 degrees. The change in orientation of the second section may be less than any of the values described or may fall within a range between any two of the values described. The change in orientation may be about a vertical angle. The change in orientation may include a vertical component. The change in orientation may include a component that is in a direction parallel to the direction of gravity. The change in orientation may be unlimited. Alternatively, one or more limiting structures may limit the change in orientation (e.g., in an upwards direction and/or a downwards direction).

One or more propulsion units 130 may be supported by the second section. For instance, a second section of an assistant arm may bear weight of one or more propulsion units. The first section of the assistant arm may or may not bear weight of one or more propulsion units. In some instances, at least one of the propulsion units may be supported by the second section. The first section may or may not support any propulsion units.

A change in orientation of the second section relative to the UAV body and/or the first section may result in a change in orientation of the one or more propulsion units supported by the second section relative to the UAV body and/or first section. For instance, one or more rotor blades, shafts, or actuators of propulsion units may change orientation when the UAV transforms between a flight configuration and/or a landing configuration. The change in orientation of the propulsion units (or any components of the propulsion units as described) may be by any number of degrees, such as at least 1 degree, 3 degrees, 5 degrees, 10 degrees, 15 degrees, 20 degrees, 30 degrees, 45 degrees, 60 degrees, 75 degrees, 85 degrees, 90 degrees, 95 degrees, 105 degrees, 120 degrees, 135 degrees, 150 degrees, or 165 degrees. The change in orientation of the propulsion units may be less than any of the values described or may fall within a range between any two of the values described. The change in orientation may be about a vertical angle. The change in orientation may include a vertical component. The change in orientation may include a component that is in a direction parallel to the direction of gravity.

The one or more propulsion units may be disposed on any portion of the second section. Any description elsewhere herein about variation of where the propulsion units can be disposed on an arm may also apply to where the propulsion units can be disposed on the second section of an assistant arm.

A joint 116 may be provided between the first section 112 and the second section 114. The joint may permit the first section and/or the second section to move relative to one another. The joint may allow the first section and the second section to be operably coupled to one another while the first and second section may move relative to one another. The joint may allow the first section to directly contact the second section. Alternatively, the joint may include one or more intermediary pieces that may connect the first section and the second section. The joint may provide one or more pivots that may allow a second section to move relative to a first section about an axis of rotation. In some instances, the second section may move relative to the first section about a single axis of rotation, two axes of rotation, or three axes of rotation. The joint may or may not include a limiting structure that may limit a degree of rotation in a single direction or multiple directions.

One or more of the arms may be a main arm 120 which does not transform into a leg. The main arm may or may not transform. The main arm may be formed from a single integral piece or from multiple pieces. The main arm may not have any sections that are movable relative to one another. The main arms may remain at a fixed position relative to a UAV body. The main arms may remain at a fixed orientation and/or spatial location relative to the UAV body. The main arm may remain at the same orientation relative to the UAV body when the UAV is in a flight configuration and when the UAV is in a landing configuration.

The main arms 120 of the UAV may have a different length than the assistant arms 110 of the UAV. The main arms may be shorter than the assistant arms of the UAV. The main arms may alternatively be longer than the assistant arms of the UAV, or may be the same length as the assistant arms of the UAV. In some instances, a first section 112 of an assistant arm may have a same length or different length than the main arm. The first section of the assistant arm may be longer or shorter than the main arm. Optionally, a second section 114 of an assistant arm may have a same length or different length than the main arm. The second section of the assistant arm may be longer or shorter than the main arm.

The main arms may have the same cross-sectional shape or dimension (e.g., length, width, diagonal, diameter) as the assistant arms of the UAV. Alternatively, the main arms may have a different cross-sectional shape and/or dimension relative to the assistant arms of the UAV. In one example, the main arms may have a larger cross-sectional dimension than the assistant arms of the UAV. In another example, the main arms may have a smaller cross-sectional dimension than the assistant arms of the UAV. Examples of cross-sectional shapes of the main arms and/or assistant arms may include circles, ellipses, ovals, squares, rectangles, trapezoids, parallelograms, pentagons, hexagons, octagons, crescents, "I" shapes, "H" shapes, "X" shapes, "T" shapes, "Y" shapes, "D" shapes, or any other regular or irregular polygonal shape. The arms may be hollow or solid. In some instances, the arms may form a substantially tubular shape.

The UAV may include one or more assistant arms and one or more main arms. The same number of assistant arms and main arms may be provided. Alternatively, there may be more assistant arms or more main arms. In some instances, a UAV may only include assistant arms, or may only include main arms. The UAV may have any number of arms and/or types of arms. A first subset of the arms of the UAV may function as a landing support when the UAV is not in flight (e.g., assistant arms) and a second subset of the arms of the UAV may not bear weight of the UAV when the UAV is not in flight (e.g., main arms). The number of arms belonging to the first subset may be the same as the number of arms belonging to the second subset. For instance, one, two, three, four, five, six, seven, eight, nine, ten, or more arms may be provided in the first subset and/or the second subset. The number of arms belonging to the first subset and second subset may be different. The number of arms between the first and second subsets may be different by at least one, two, three, four, five, six, seven, eight, nine, ten or more arms.

A UAV may include a UAV body 140. The UAV body may be a central body. A center of gravity of the UAV may be within the UAV body, above a UAV body, or below a UAV body. A center of gravity of the UAV may pass through an axis extending vertically through the UAV body. The UAV body may support one or more arms 110, 120 of the UAV. The UAV body may bear weight of the one or more arms. The UAV body may directly contact one or more arms. The UAV body may be integrally formed with one or more arms or components of one or more arms. The UAV may connect to the one or more arms via one or more intermediary pieces.

The UAV body may be formed from a solid piece. Alternatively, the UAV body may be hollow or may include one or more cavities therein. The UAV body may have a y shape. The UAV may have a substantially disc-like shape in some embodiments.

The UAV body may include a housing that may partially or completely enclose one or more components therein. The components may include one or more electrical components. Examples of components may include, but are not limited to, a flight controller, one or more processors, one or more memory storage units, a communication unit, a display, a navigation unit, one or more sensors, a power supply and/or control unit, one or more electronic speed control (ESC) modules, one or more inertial measurement units (IMU) or any other components. Examples of sensors on a UAV (which may be within the housing, outside the housing, embedded in the housing, or any combination thereof) may include one or more of the following: one or more sensors can comprise one or more of: a global positioning system (GPS) sensor, a vision sensor, a temperature sensor, a lidar sensor, an ultrasonic sensor, a barometer, or an altimeter. Any sensor suitable for collecting environmental information can be used, including location sensors (e.g., GPS sensors, mobile device transmitters enabling location triangulation), vision sensors (e.g., imaging devices capable of detecting visible, infrared, or ultraviolet light, such as cameras), proximity sensors (e.g., ultrasonic sensors, lidar, time-of-flight cameras), inertial sensors (e.g., accelerometers, gyroscopes, inertial measurement units (IMUs)), altitude sensors, pressure sensors (e.g., barometers), audio sensors (e.g., microphones) or field sensors (e.g., magnetometers, electromagnetic sensors). Any suitable number and combination of sensors can be used, such as one, two, three, four, five, or more sensors.

Similarly, any of the components described may be disposed on, within, or embedded in an arm of the UAV. The arms may optionally include one or more cavities that may house one or more of the components (e.g., electrical components). In one example, the arms may or may not have inertial sensors that may provide information about a position (e.g., orientation, spatial location) or movement of the arms. The various components described may be distributed on a body of the UAV, the arms of the UAV, or any combination thereof.

The UAV may carry a payload 150. The payload may include a device capable of sensing the environment about the movable object, a device capable of emitting a signal into the environment, and/or a device capable of interacting with the environment.

One or more sensors may be provided as a payload, and may be capable of sensing the environment. An example of a sensor may be a camera. Any other sensors, such as those described elsewhere herein may be provided as a payload.

In one example, the payload may be a camera. Any description herein of a camera may apply to any type of image capture device, and vice versa. A camera may be a physical imaging device. An imaging device can be configured to detect electromagnetic radiation (e.g., visible, infrared, and/or ultraviolet light) and generate image data based on the detected electromagnetic radiation. An imaging device may include an image sensor, such as a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like.

The camera may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The camera may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The camera may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

One or more cameras supported by the UAV may have one or more of the same parameters, characteristics or features. In some instances, all of the cameras supported by the UAV may have the same characteristics or features. Alternatively, one or more of the cameras supported by the UAV may have different characteristics or features. In some instances, each of the cameras supported by the UAV may have different characteristics or features.

The one or more cameras may be supported by a UAV body. The one or more cameras may be supported on a central body of the UAV. The one or more cameras may or may not be supported on one or more arms of the UAV. The one or more cameras may be supported by a housing of the UAV. The one or more cameras may be attached to an external surface of the housing the UAV. The one or more cameras may be embedded within an external surface of the housing of the UAV. The one or more cameras may have an optical element, such as a lens, that may be exposed to an environment exterior to the UAV. The optical element may optionally be protected from an environment exterior to the UAV with aid of a cover. The cover may be transparent. The cover may or may not include an optical filter.

Any number of cameras may be provided. For instance, there may be 1 or more, 2 or more, 3 or more, 4 or more, 5 or more cameras supported by the UAV.

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellant materials, food, packages, or any other item.

The payload may be stationary relative to a UAV body. The payload may be configured so that it does not move relative to the UAV body during operation of the UAV (e.g., flight of the UAV). The payload may be configured so that it does not move relative to the UAV body during operation of the payload (e.g., capturing images by a camera). The payload may be affixed relative to the UAV body.

The payload may be movable relative to a UAV body. The payload may be configured so that it is capable of movement relative to the UAV body during operation of the UAV (e.g., flight of the UAV). The payload may be configured so that the payload is capable of movement relative to the UAV body during operation of the payload (e.g., capturing images by a camera). The payload may be supported with aid of one or more carriers or components that may enable the payload to move relative to the UAV body. For instance, a payload may translate along one, two or three directions relative to the UAV body, or rotate about one, two, or three axes relative to the UAV body. The carrier may permit a change in orientation of the payload relative to the UAV body. The payload may be supported by a carrier having a gimbaled frame assembly. Any characteristics described elsewhere herein for a payload and a carrier may be applied. The payload may be moved relative to the UAV body with aid of one or more actuators.

The payload may be supported by the UAV body. The payload may be supported by one or more arms of the UAV. The payload may be beneath the UAV body. The payload may be supported beneath a central body, above a central body, or on a side of a central body.

A payload may have a functional space. The payload can be configured to perform a function or operation. The function or operation of the payload may require a certain amount of functional space. The functional space can be, for example, a space occupied, affected, manipulated, or otherwise used by the payload during its operation. In some instances, however, the functional space may be obstructed by a portion of the transformable aerial vehicle. Any obstruction of a functional space may interfere with the operation of the payload. In one example, a functional space of the payload may include a sensing field of a payload. For example, when a payload is a camera, the functional space of the camera may be a field of view of the camera.

An assistant arm 120 may be configured so that while in a flight configuration, the assistant arm does not interfere with the functional space of the payload. In a landing configuration, the assistant arm may interfere with the functional space of the payload. Thus, the functional space of the payload may be increased when the UAV is in flight and may be decreased when the UAV is landed. The functional space of the payload may be increased when one or more assistant arms are in a flight configuration and may be decreased when the one or more assistant arms are in a landing configuration.

For example, the payload may be a camera. The camera may have a field of view that is unobstructed by the arms of the UAV when the UAV is in flight. The camera may have a field of view that is obstructed by one or more arms of the UAV when the UAV is landed. The camera may have a field of view that is unobstructed when the UAV the one or more assistant arms are in a flight configuration. The camera may have a field of view that is obstructed by a portion of the one or more assistant arms when the one or more assistant arms in a landing configuration. The field of view may be unobstructed for a 360 degree panoramic view around the camera when the UAV is in flight. The camera may rotate to capture a 360 panoramic view (e.g., about a yaw axis). The camera may be permitted to rotate at least 360 degrees, at least 720 degrees, or even more.

The decreased functional space (e.g., obstruction to a potential field of view of a camera) may during landing may be acceptable since the UAV is on the ground, while allowing the UAV to have increased functional space (e.g., a potential 360 degree panoramic view) while the UAV is flying around.

Flight of the UAV may be controlled with aid of a remote terminal. A user may interact with the remote terminal to control flight of the UAV. The remote terminal may initiate flight of the UAV and/or landing of the UAV. The remote terminal may or may not directly control transformation of one or more arms of the UAV. In some instances, the transformation of the one or more arms may occur automatically in response to a sensed condition, or a command to land or take-off. The remote terminal may initiate one or more predetermined flight sequence or a type of flight mode. The UAV may be capable of autonomous, semi-autonomous, or direct manual controlled flight.

Operation of one or more components of the UAV may be controlled with aid of a remote terminal. The remote terminal controlling operation of the one or more components of the UAV may be the same as a remote terminal controlling flight of the UAV, or may be a different device from the remote terminal controlling flight of the UAV. The remote terminal may control operation of a payload, such as a camera. The remote terminal may control positioning of the payload. The remote terminal may control operation of a carrier that supports the payload, which may affect positioning of the payload. The remote terminal may affect operation of one or more sensors carried by the UAV.

Figure 12:
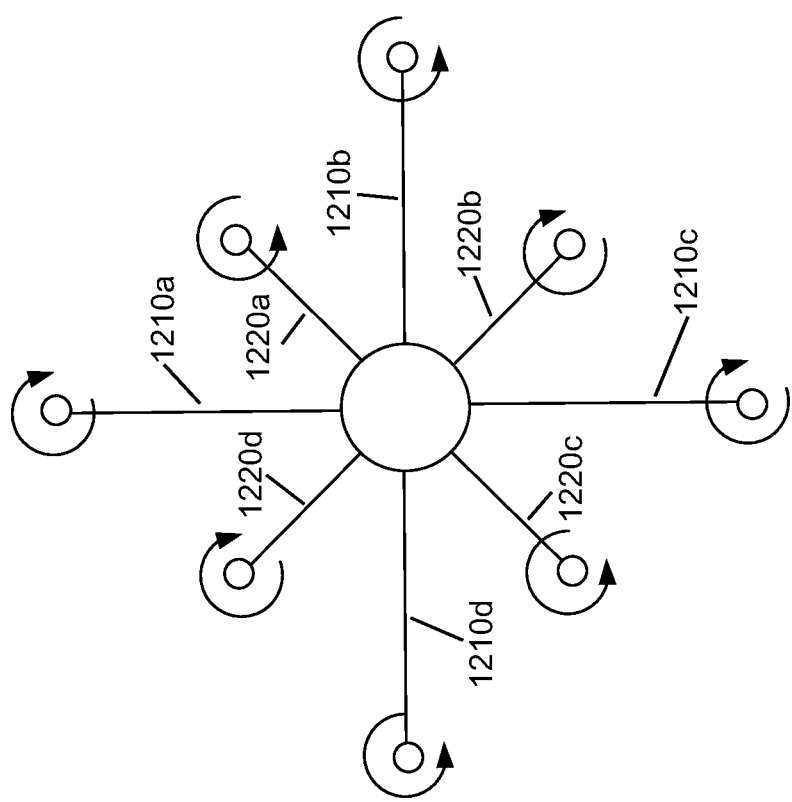
FIG. 12 provides a schematic for rotation of one or more propulsion units supported by a UAV.

FIG. 12 provides a schematic for rotation of one or more propulsion units supported by a UAV. As previously described, one or more arms of the UAV may support one or more propulsion units. A first subset of the arms 1210*a*, 1210*b*, 1210*c*, 1210*d* may include assistant arms, which may transform between a flight configuration and a landing configuration. A second subset of arms 1220*a*, 1220*b*, 1220*c*, 1220*d* may include main arms which do not transform between a flight configuration and landing configuration. The first subset and second subset of arms may have one or more different physical characteristics (e.g., length, cross-sectional shape, cross-sectional dimension, number of sections, location of propulsion units, or any other characteristics).

In one example, the first subset and second subset of arms may be located to be substantially coplanar. The first and second subset of arms may be substantially coplanar while the UAV is in flight. The first and second subset of arms may be laterally disposed around a UAV body. One or more arms belonging to the first subset may be positioned between one or more arms belonging to the second subset. The first and second subset of arms may be arranged in an alternating fashion. For instance, the arms may laterally alternate between an assistant arm and a main arm, as illustrated in FIG. 12. A single assistant arm may be provided between main arms, and/or a single main arm may be provided between assistant arms. Any other configuration may be provided. For instance, two, three, four, five, or six assistant arms may be provided between main arms, and/or two, three, four, five, or six main arms may be provided between assistant arms.

The first subset and second subset of arms may be evenly radially disposed. The same number of degrees may be provided between assistant arms as between main arms. The same number of arms may be provided between each set of adjacent assistant arms and main arms.

In some instances, the first subset and second subset of arms may have the same number of arms. The same number of assistant arms and main arms may be provided. Alternatively, there may be a greater number of arms in the first subset or a greater number of arms in the second subset. There may be at least one arm belonging to the first subset and/or at least one arm belonging to the second subset. The number of arms in the first subset may be at least 1×, 2×, 3×, 4×, or 5× the number of arms in the second subset, or vice versa.

The propulsion units may include one or more rotating components, such as rotor blades, shafts, or actuators. The rotating components may rotate in any direction. In one example, opposing arms belonging to the same subset may have rotating components that rotate in the same direction. For example, a first opposing pair of arms of the first subset 1210*a*, 1210*c* may have rotating components that rotate in a first direction while a second opposing pair of arms of the first subset 1210*b*, 1210*d* may have rotating components that rotate in a second direction opposite the first direction. A first opposing pair of arms of the second subset 1220*b*, 1220*d* may have rotating components that rotate in a first direction while a second opposing pair of arms of the second subset 1220*a*, 1220*c* may have rotating components that rotate in a second direction opposite the first direction.

Alternating pairs of adjacent arms may have rotating components that rotate in opposing directions. For instance, a first pair of adjacent arms 1220*a*, 1210*b* may have rotatable components that rotate in a second direction, a second pair of adjacent arms 1220*b*, 1210*c* may have rotatable components that rotate in a first direction, a third pair of adjacent arms 1220*c*, 1210*d* may have rotatable components that rotate in the first direction, and a fourth pair of adjacent arms 1220*d*, 1210*a* may have rotatable components that rotate in the second direction.

Adjacent arms within the same subset may have rotating components that rotate in opposing directions. For instance, within a first subset of arms, a first arm 1210*a* may have a rotatable component that rotates in a first direction, a second arm 1210*b* adjacent to the first arm may have a rotatable component that rotates in a second direction, a third arm 1210*c* adjacent to the second arm may have a rotatable component that rotates in the first direction, and a fourth arm 1210*d* adjacent to the third arm may have a rotatable component that rotates in the second direction. Similarly, within a second subset of arms, a first arm 1220*a* may have a rotatable component that rotates in a second direction, a second arm 1220*b* adjacent to the first arm may have a rotatable component that rotates in a first direction, a third arm 1220*c* adjacent to the second arm may have a rotatable component that rotates in the second direction, and a fourth arm 1220*d* adjacent to the third arm may have a rotatable component that rotates in the first direction.

Alternatively, all the arms of the same subset may have rotatable components (e.g., rotor blades, actuators, shafts) that rotate in the same direction. For instance, all the arms in the first subset may have rotatable components that rotate in a first direction while all the arms in the second subset may have rotatable components that rotate in a second direction opposite the first direction. In some embodiments, half the arms within the same subset may have rotatable components that rotate in the first direction while half the arms within the same subset may have rotatable components that rotate in the second direction. For example, half the arms in the first subset may have rotatable components that rotate in the first direction while half the arms in the first subset may have rotatable components that rotate in the second direction, and/or half the arms in the second subset may have rotatable components that rotate in the first direction while half the arms in the second subset may have rotatable components that rotate in the second direction. Half of the arms overall on the UAV may have rotatable components that rotate in the first direction, while half the arms overall on the UAV may have rotatable components that rotate in the second direction. Optionally, at least two of the rotatable components rotating in the same direction may be adjacent to one another.

The propulsion units may be configured to provide a stable lift to the UAV. The rotatable components may be arranged and rotate in a direction that will allow for stable lift to be provided to the UAV. The torques created by the individual propulsion units may be balanced out.

The torques created by the individual propulsion units within each subset of arms may be balanced out. For instance, the torques created by the individual propulsion units within the first subset of arms (e.g., assistant arms) may be balanced out. The torques created by the individual propulsion units within the second subset of arms (e.g., main arms) may be balanced out. This may allow for the UAV to retain stable flight, even when changing between different configurations. For instance, even when the assistant arms are changing between a flight configuration and a landing configuration, the UAV may be able to maintain stable flight. The balanced torque of the main arms may allow the UAV to main stable flight, even when the assistant arms are being used as legs, or transitioning to or from a landing configuration. The balanced torque of the assistant arms may allow the assistant arms to move between the landing configuration and the flight configuration in an even and stable manner.

Figure 2:
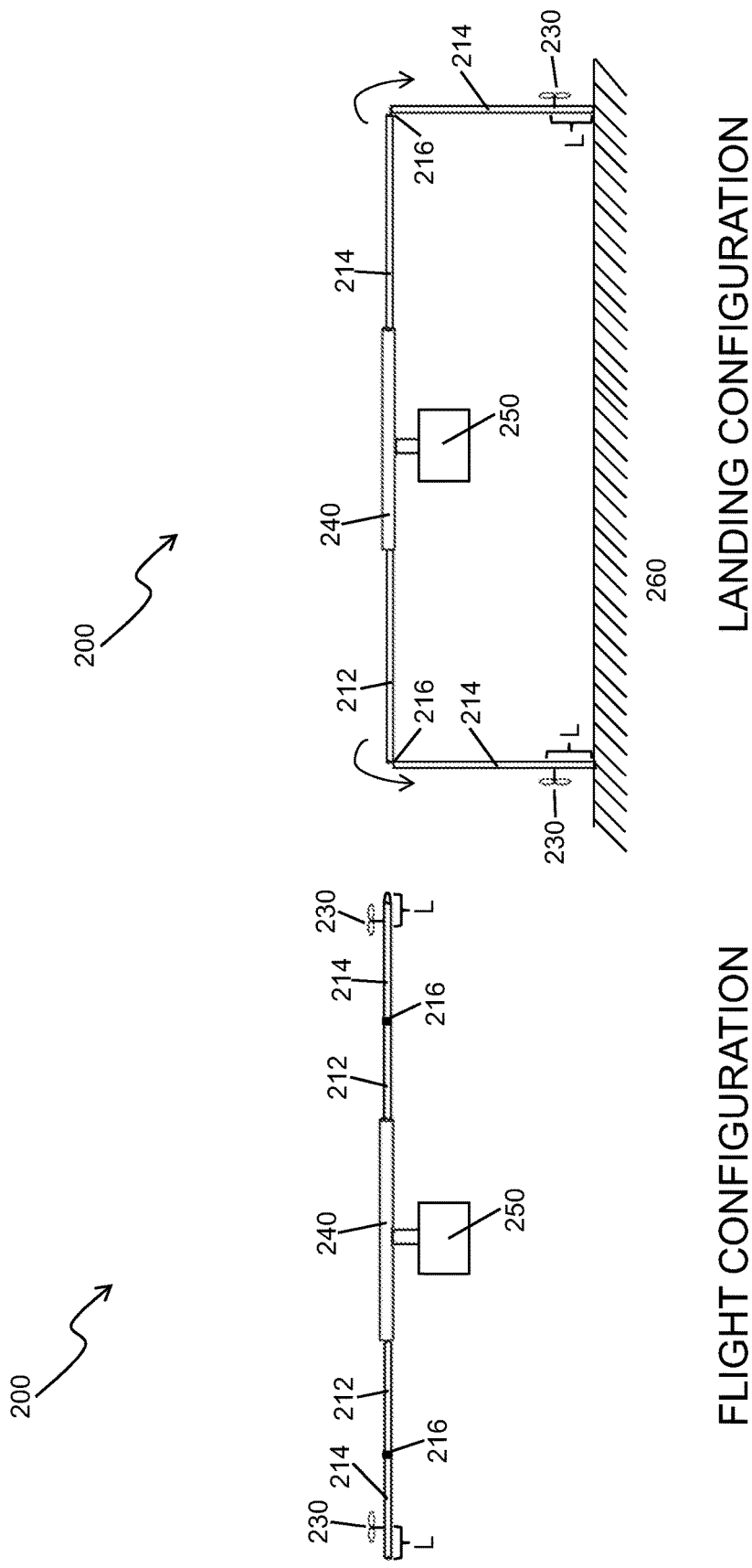
FIG. 2 shows a schematic profile view of a UAV in a flight configuration and in a landing configuration, in accordance with embodiments of the invention.

FIG. 2 shows a schematic profile view of a UAV in a flight configuration and in a landing configuration, in accordance with embodiments of the invention. A UAV 200 may include a central body 240, and one or more arms, which may include a first section 212 and a second section 214. A joint 216 may allow the first section and second section to move relative to one another. One or more propulsion units 230 may be supported by an arm of the UAV. At least a portion of the arm may include a length L that may extend beyond a location of the arm that supports a propulsion unit. The UAV may also carry a payload 250. The UAV may have a flight configuration while in flight, and a landing configuration when resting on an underlying surface 260. One or more of the arms of the UAV may transform between arms that may provide lift to the UAV when the UAV is in a flight configuration, and legs that bear weight of the UAV when the UAV is in a landing configuration. The legs may function as landing gears when the UAV is in the landing configuration. The landing gears may be retracted away from an underlying surface when transforming to a flight configuration. In some embodiments, the landing gear may be retracted away with aid of one or more propulsion units, when the one or more propulsion units generate lift to lift the landing gear away. Similarly, the landing gear may be opened when one or more propulsion units reduces the amount of propulsion such that gravity brings the landing gear toward the underlying surface, as described in greater detail elsewhere herein.

As previously described, a UAV may include one or more assistant arms that may transform between a flight configuration and landing configuration. The UAV may optionally include additional arms, which are not shown in FIG. 2 for ease of illustration.

The one or more transformable arms may be supported by a UAV body 240. A transformable arm may include a first section 212 and a second section 214. In some instances, each transformable arm of the UAV may include a first section and a second section. In some instances, one or more of the transformable arms may include additional sections (e.g., third section, fourth section, etc.) or may not include additional sections. The first section and/or second section may be movable relative to one another.

The first section 212 may be proximal to the UAV body. The second section 214 may be distal to the UAV body. The first proximal section may be closer to the UAV body than the second distal section.

The first section may optionally be coupled to the UAV body. The first section may optionally not move relative to the UAV body. The first section may optionally not change orientation relative to the UAV body. The first section may optionally change orientation in a vertical direction relative to the UAV body. The first section may or may not change orientation in a horizontal direction relative to the UAV body. The first sections from multiple transformable arms may be substantially coplanar. An axis running through a length of a first section of a transformable arm may be substantially horizontal and/or lateral relative to the UAV body. Axes running through the lengths of each of the first sections of the transformable arms on a UAV may be substantially coplanar. The first sections may remain substantially lateral and/or coplanar during flight of the UAV. The first sections may remain substantially lateral and/or coplanar while the UAV is landed. The first section may retain substantially the same configuration between the flight configuration and the landing configuration of the UAV.

The second section may be coupled to the first section at a joint 216. The second section may optionally move relative to the UAV body and/or the first section. The second section may optionally change orientation relative to the UAV body and/or the first section. The second section may optionally change orientation in a vertical direction relative to the UAV body and/or the first section. The second section may or may not change orientation in a horizontal direction relative to the UAV body and/or first section. The second sections from multiple transformable arms may be substantially coplanar while the UAV is in flight. An axis running through a length of a second section of a transformable arm may be substantially horizontal and/or lateral relative to the UAV body when the UAV is in flight. Axes running through the lengths of each of the second sections of the transformable arms on a UAV may be substantially coplanar when the UAV is in flight.

The second sections may remain substantially lateral and/or coplanar during flight of the UAV, and the sections may not remain substantially lateral and/or coplanar while the UAV is landed. The second section may change configuration between the flight configuration and the landing configuration of the UAV. The second section may fold downward during a landing configuration of the UAV. The second section may fold downward by any number of degrees, such as the various degrees described elsewhere herein. The second section may fold downward by at least the degrees described elsewhere herein. In one example, the second section may fold downward at substantially 90 degrees to have a vertical orientation. In one example, the second section may have a substantially vertical orientation when the UAV in a landed state. The axes running through the lengths of each of the second sections of the transformable arms on a UAV may be substantially parallel to one another when the UAV is in a landed state. The axes may be parallel to one another in a vertical direction.

The first section and second section may have substantially the same length or may have different lengths. The second section may have a sufficient length to prevent a payload 250 supported by the UAV body 240 from contacting an underlying surface 260 when the UAV is in a landed state. The second section may be longer than a height of the payload. In some instances, the second section may be longer than a height of the payload by a factor of at least 1.1, 1.2, 1.3, 1.5, 2, 2.5, 3, 4, or 5. The second section may be longer than a height of a payload plus a carrier of the payload that may affect the positioning of the payload relative to the UAV body. The second section may have a height such that a gap may be provided between the underlying surface and a lower surface of the payload, when the UAV is in a landed state.

When the UAV is in a flight configuration, the second section may be substantially co-linear with the first section and may not be obstructing a lateral view of the payload. For instance, if the payload is a camera, the camera may have an unobstructed 360 panoramic view around the camera. The camera may be capable of rotating about the 360 degrees (e.g., about the yaw axis). The first section and the second section may have the same orientation. When the UAV is in a landing configuration, the second section may not be substantially co-linear with the first section. The second section may be folded downward and may obstruct a lateral view of the payload. For instance, if the payload is a camera, the second sections coming downward may obstruct a 360 panoramic view around the camera. The first section and the second section may have different orientations when the UAV is in a landing configuration (e.g., not in flight).

The UAV may be in a transition state while the UAV is landing or taking off. While in the transition state, the second section may be in the process of folding downward while the UAV is landing, or folding upward while the UAV is taking off. The transition state may occur between the flight configuration and the landing configuration. In some instances, the transition state may be implemented quickly. For instance, the transition state may take less than 2 minutes, 1 minute, 45 seconds, 30 seconds, 20 seconds, 15 seconds, 10 seconds, 5 seconds, 3 seconds, or 1 second.

One or more propulsion units 230 may be supported by a transformable arm. In some instances, the one or more propulsion units may be supported on a second section of the transformable arm. The first section of the transformable arm may or may not support one or more propulsion units. A single propulsion unit may be supported by the transformable arm. Alternatively, multiple propulsion units may be supported by the transformable arm.

In some instances, at least a portion of the arm, having a length L may extend beyond the location of the arm that supports the propulsion unit. The arm may extend a distance L beyond the location of the arm that supports the most distal propulsion unit of the one or more propulsion units supported by the arm. The portion of the arm may extend at a distance L toward the distal end of the arm. The propulsion unit may not be at the exact distal end of the arm. For instance, the propulsion unit may be at least some distance L away from the distal end of the arm. In some instances, the most distal propulsion unit of the one or more propulsion units may be at least some distance L away from the distal end of the arm.

This may prevent the propulsion unit 230 from coming into contact with an underlying surface 260 when the UAV is in a landing configuration. The extension of length L may prevent a rotor blade from coming into contact with the underlying surface when the UAV has landed, or in the process of landing or taking off. The length L may be greater than a radius of the propulsion unit (e.g., length or radius of a rotor blade range). The length L may be greater than the radius of the propulsion unit by a factor of at least 1.1, 1.2, 1.3, 1.5, 2, 2.5, 3, 4, 5, 7, or 10.

The length L may have any relation to the length of the arm or the second section. For instance, L may be at least 1%, 3%, 5%, 10%, 15%, 20%, 25%, 30%, 35%, 40%, or 45% of the length of the transformable arm. In some instances, L may be at least 1%, 3%, 5%, 10%, 15%, 20%, 25%, 30%, 35%, 40%, 50%, 60%, 70%, 80%, or 90% of the length of the second section. In some instances, L may be less than any of the percentages described, or may fall within a range between any two percentages described. The length L may be at least 1 cm, 2 cm, 3 cm, 4 cm, 5 cm, 7 cm, 10 cm, 12 cm, 15 cm, 20 cm, 25 cm, 30 cm, or 40 cm. The length L may be less than any of the lengths described, or may fall in a range between any two lengths described.

In some embodiments, a distal end of the transformable arm may make contact with the underlying surface when the UAV is in a landed state. The portion of the distal end of the transformable arm that contacts the underlying surface may include the cross-section of the distal end of the arm making contact with the underlying surface.

Figure 3:
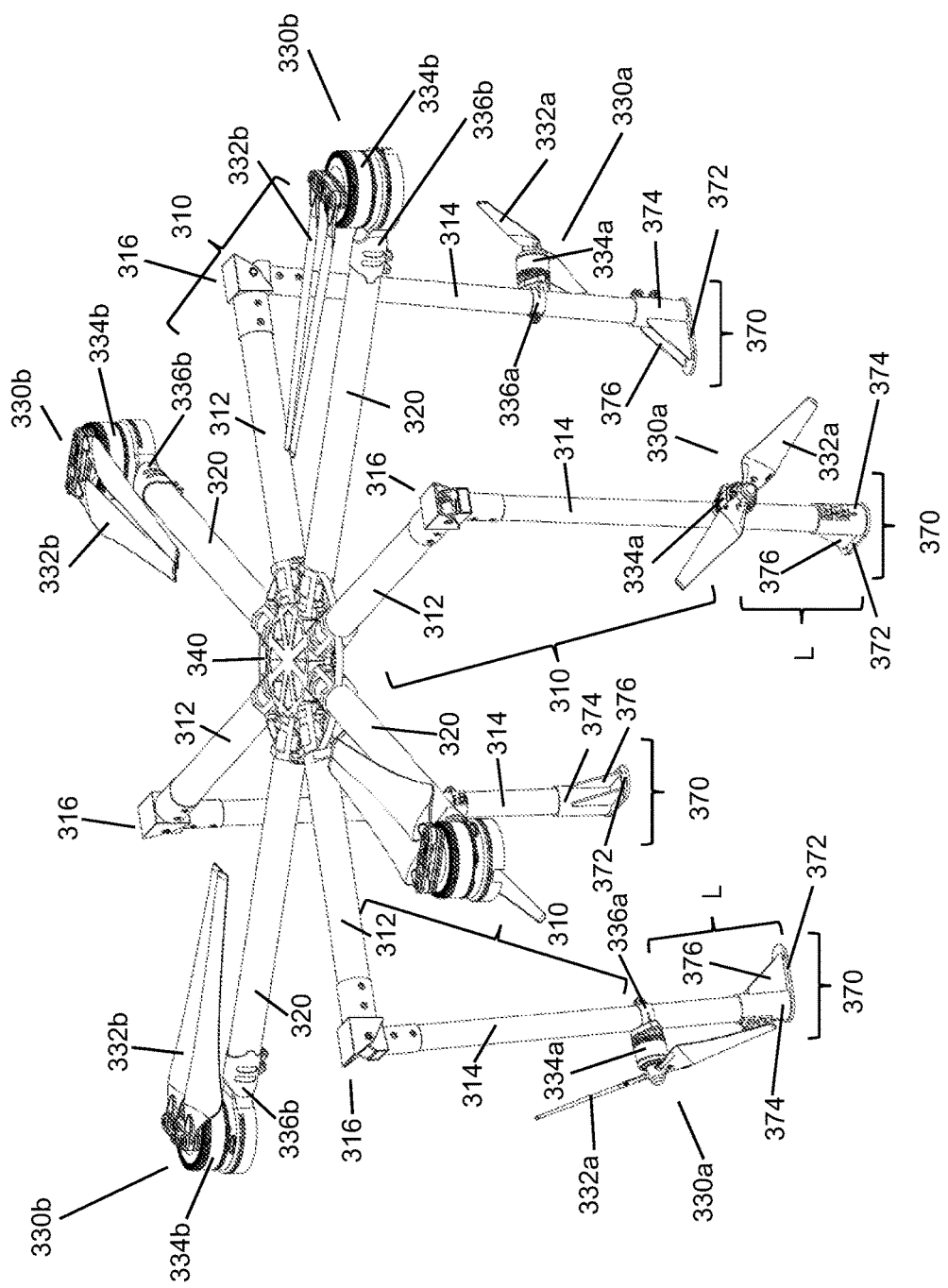
FIG. 3 provides an illustration of a UAV with transformable arms, in accordance with embodiments of the invention.

FIG. 3 provides an illustration of a UAV with transformable arms, in accordance with embodiments of the invention. The UAV may include a UAV body 340 that may support one or more arms 310, 320. The arms may support one or more propulsion units 330*a*, 330*b*. The arms may include assistant arms 310 and main arms 330. The assistant arms may include a first section 312 and a second section 314, which may be connected via a joint 316. The assistant arms may include a foot 370 that may be provided at the distal end of the assistant arm.

The UAV may include a UAV body 340 that may support one or more arms 310, 320. The arms may support one or more propulsion units 330*a*, 330*b*. The arms may extend radially from the UAV body. The UAV body may include a frame that may connect to the one or more arms. The UAV body may have a substantially flat shape. The UAV body may have a substantially circular shape. The UAV body may have any shape, such as a circular, elliptical, oval, square, rectangle, pentagon, hexagon, octagon, or any other type of shape, which may include a regular or irregular polygon.

Zero, one or more of the arms may be main arms 320. The main arms may support one or more propulsion units 330*b*. The propulsion units may be provided at or near the distal end of the main arms. The main arm may or may not have any length extending beyond the location of the main arm that supports the propulsion units. The main arms may be formed from a tube. The main arm may have any cross-sectional shape, as described elsewhere herein. The main arm may be formed from a single integral piece, or may include multiple pieces that may be connected to one another. The main arm may have substantially the same cross-sectional shape and/or dimension along the length of the arm.

The arms of the UAV 310, 320 may be substantially coplanar while the UAV is in flight. A first subset (e.g., assistant arms) and a second subset (e.g., main arms) may be substantially non-coplanar while the UAV is not in flight. In some embodiments, half the arms of the UAV may be assistant arms. Alternatively, more than or less than half the arms of the UAV may be assistant arms. In some embodiments all of the arms may be assistant arms.

The propulsion unit 330b may include one or more rotor blades 332b. Motion of the rotor blades may be driven by one or more actuators 334b. An attachment mechanism 336b may attach the propulsion unit to the main arm 320.

In some instances, a plurality of rotor blades 332b may be provided for a propulsion unit. The plurality of rotor blades may be attached to the same shaft or different shafts. The attachment points for the rotor blades may or may not be co-axial. The plurality of rotor blades may or may not move relative to one another. In some instances, the rotor blades may be folded to provide a decreased footprint of the UAV.

The actuators 334b may drive motion of the rotor blades. The actuators may drive motion of one or more shafts, which may in turn drive the motion of the rotor blades. The actuators may be located beneath the rotor blades. The actuators may be located above an upper surface of the main arm, within a cavity of the main arm, below a lower surface of the main arm, or any combination thereof. The actuators may be beyond the distal end of the main arm, or may be at or near the distal end of the main arm.

The propulsion unit may be attached to the main arm with aid of an attachment mechanism 336b. The attachment mechanism may cover a distal end of the main arm. The attachment mechanism may encircle a perimeter of a cross-section of the main arm. The attachment mechanism may include a pocket that may accept a distal end of the main arm. The attachment mechanism may support the actuator and/or rotor blades. The attachment mechanism may include a support that may be beneath the actuator. The support may or may not encircle the actuator or be above the actuator.

The main arm may keep the position (e.g., orientation, spatial disposition) of the propulsion unit relative to the UAV body the same. The position of the propulsion unit relative to the UAV may be same during flight of the UAV and landing or take off the UAV. The position of the propulsion unit relative to the UAV may remain the same when the UAV is in a flight configuration and a landing configuration. The main arm may optionally not move relative to the UAV body when the UAV transforms between a flight configuration and a landing configuration. The main arm may remain stationary relative to the UAV body when the UAV transforms between a flight configuration and a landing configuration. The main arms of the UAV may remain stationary relative to one another. The position of the propulsion units supported by the main arms may remain stationary relative to one another.

Zero, one or more of the arms may be assistant arms 310. The assistant arms may support one or more propulsion units 330a. The propulsion units may be provided at or near the distal end of the assistant arms. The assistant arm may or may not have a length extending beyond the location of the assistant arm that supports the propulsion units. In some embodiments, the length may be greater than a radius of the propulsion unit. The assistant arms may be formed from one or more tubes. The assistant arms may have any cross-sectional shape, as described elsewhere herein. The assistant arm may be formed from one, two, or more section 312, 314. Each section may be formed from a single integral piece, or may include multiple pieces that may be connected to one another. The assistant arm and/or each section of the assistant arm may have substantially the same cross-sectional shape and/or dimension along the length of the arm and/or section.

The propulsion unit 330a may include one or more rotor blades 332a. Motion of the rotor blades may be driven by one or more actuators 334a. An attachment mechanism 336a may attach the propulsion unit to the assistant arm 310.

In some instances, a single set of rotor blades 332b may be provided for a propulsion unit. The set of rotor blades may be attached to a shaft passing through a middle portion of the set of rotor blades. Alternatively, a plurality of rotor blades may be provided. The plurality of rotor blades may be attached to the same shaft or different shafts. The attachment points for the rotor blades may or may not be co-axial. A plurality of rotor blades may or may not move relative to one another. The rotor blades may or may not be folded to provide a decreased footprint of the UAV.

The actuators 334a may drive motion of the rotor blades. The actuators may drive motion of one or more shafts, which may in turn drive the motion of the rotor blades. The actuators may be located beneath the rotor blades. The actuators may be located above an upper surface of the assistant arm, within a cavity of the assistant arm, below a lower surface of the assistant arm, or any combination thereof. The actuators may be along the length of the assistant arm, before the distal end of the assistant arm.

The propulsion unit may be attached to the assistant arm with aid of an attachment mechanism 336a. The attachment mechanism may attach the propulsion unit to the arm before a distal end of the assistant arm. A distal end of the arm may extend beyond the location of the attachment mechanism. In some embodiments, a length L of the assistant arm may extend past the attachment mechanism. The attachment mechanism may encircle a perimeter of a cross-section of the assistant arm. The attachment mechanism may include a loop or tunnel through which the distal end of the assistant arm may pass. The attachment mechanism may support the actuator and/or rotor blades. The attachment mechanism may include a support that may be beneath the actuator.

The assistant arm may include a first section 312 and a second section 314. The first section may be proximal to the UAV body and the second section may be distal to the UAV body. The first section and second section may move relative to one another when the UAV is changing configurations. The first section and second section may be co-linear when the UAV is in a flight configuration. The first section and the second section may not be co-linear when the UAV is in a landing configuration. The first sections and the second sections of the assistant arms of the UAV may be coplanar while the UAV is in a flight configuration. The second sections of the assistant arms of the UAV may not be coplanar with the first sections and/or the UAV body when the UAV is in the landing configuration. As illustrated in FIG. 3, the second sections may be folded substantially downward when the UAV is in the landing configuration.

The first section 312 may keep its position (e.g., orientation, spatial disposition) relative to the UAV body the same. The position of the first section of the assistant arm may be the same during flight of the UAV and landing or take off of the UAV. The position of the first section relative to the UAV body may remain the same when the UAV is in a flight configuration and a landing configuration.

The first section may have any characteristic relative to the main arms. In some embodiments, the first section of the assistant arm and the main arm may have the same length. Alternatively, the main arm may have a greater length, or the first section of the assistant arm may have a greater length. The first section of the assistant arm and the main arm may have the same cross-sectional shape and/or dimension. Alternatively, they may have different shapes and/or dimensions.

Optionally, the first section does not support any propulsion units. Alternatively, one or more propulsion units may be supported on the first section.

The second section 314 may change its position (e.g., orientation, spatial disposition) relative to the UAV body and/or the first section. The position of the second section of the assistant arm may change between flight of the UAV and landing or take off of the UAV. The position of the second section relative to the UAV body may change between a UAV flight stage and a UAV landing stage.

The second section may have any characteristic relative to the main arms and/or the first sections. In some embodiments, the second section of the assistant arm and the main arm may have the same length. Alternatively, the main arm may have a greater length, or the second section of the assistant arm may have a greater length. The second section of the assistant arm and the first section of the assistant arm may have the same length. Alternatively, the first section may have a greater length, or the second section may have a greater length. The second section of the assistant arm and the main arm may have the same cross-sectional shape and/or dimension. Alternatively, they may have different shapes and/or dimensions. Similarly, the second section of the assistant arm and the first section of the assistant arm may have the same cross-sectional shape and/or dimension. Alternatively, they may have different shapes and/or dimensions.

The second section may support one or more propulsion units 330*a*. The propulsion units may move with the second section. For instance, when the second section changes position, the propulsion units may correspondingly change position. When the second section changes orientation, the propulsion units may change orientation. The propulsion units may change orientation by the same amount as the second section. For instance, if the second section rotates by 90 degrees, the propulsion unit may correspondingly rotate by 90 degrees. When the second section changes spatial disposition, the propulsion units may change spatial disposition. The propulsion units may change spatial disposition by the same amount as the second section or a corresponding portion of the second section. The second section may pivot about a joint 316. The second section may pivot at a proximal end of the second section. The propulsion unit may travel along an arc following the motion of the second section. The radius of the arc may be the length of the second section minus L.

The distance L may be greater than a length of a rotor blade 332*a*. This may prevent the rotor blade from coming into contact with a surface upon which the UAV may rest when the UAV is not in flight.

The location of the propulsion units on the assistant arm may be fixed. Alternatively, the location of the propulsion units may be variable. For instance, the propulsion units may be permitted to slide along the length of the assistant arm (e.g., the second section of the assistant arm). A locking mechanism may be provided which may prevent the propulsion units from making any unwanted movements along the assistant arm. Each of the propulsion units on each of the assistant arms may be at the same distance L from the distal end of the assistant arm. Alternatively, they may be at different distances from the end of the assistant arm.

The propulsion units supported by the main arms 330*b* and the propulsion units of the assistant arms 330*a* may have the same characteristics. Alternatively, they may have one or more characteristics that are different. For instance, the main arm propulsion units may have different sizes, shapes, and/or arrangements of rotor blades 332*b* relative to the rotor blades of the assistant arm 332*a*. In one example, the rotor blades of the main arms may have a greater length than the rotor blades of the assistant arms. Alternatively, the rotor blades of the assistant arms may have a greater length than the rotor blades of the main arms. In some instances, they may have the same length. The propulsion units of the main arms may be capable of generating a greater amount of thrust when the actuators rotate at the same rate compared to the propulsion units of the assistant arms. Alternatively, the propulsion units of the assistant arms may generate a greater amount of thrust than the main arms for the same speed of rotation. In some instances, they may generate the same amount of thrust.

The actuators for the propulsion units on the main arm 334*b* and the assistant arms 334*a* may be of the same type and/or have the same characteristics. Alternatively, they may of different types and/or have different characteristics. In some instances, the actuators of the propulsion units for the main arm may provide more power than the actuators of the assistant arm, or vice versa. The actuators of the propulsion units for the main arm may be capable of operating at a higher RPM than the actuators of the assistant arm or vice versa. The actuators of the propulsion units on the main arm may consume more energy than the propulsion units of the assistant arm, or vice versa.

The attachment mechanisms for the propulsion units on the main arm 336*b* and the assistant arms 336*a* may be of the same type and/or may have the same characteristics. They may be different types and/or have different characteristics. They may have different shapes. They may be designed to be attached to different portions of the arms. For instance, the attachment mechanisms on the main arm may be designed to attach and cover a distal end of the main arm, while the attachment mechanism on the assistant arm may be designed to attach to the arm before the distal end of the arm, and leaves the distal end of the assistant arm uncovered.

The first section 312 and a second section 314 may be connected via a joint 316. The joint may keep the first and second sections connected while the UAV may change configurations. The joint may permit the second section to move relative to the first section when the UAV changes configurations. A distal end of the first section may connect to the joint, which may in turn connect to a proximal end of the second section. The joint may include a pivot point about which the second section may rotate. Further details and embodiments of the joint are described in greater detail elsewhere herein.

An assistant arm may include a foot 370 that may be provided at the distal end of the assistant arm. In some embodiments each assistant arm may have a foot at the distal end of the assistant arm. Alternatively, one or more of the assistant arms may not have feet. The foot may be provided at a distal end of a second section of the assistant arm. The main arms may optionally not have feet. The foot may comprise an auxiliary support.

The foot may be configured to contact the underlying surface when the UAV is landed and resting on the surface. The foot may cover the distal end of the assistant arm. The foot may provide an auxiliary support or section to the assistant arm. The foot may have a bottom 372 which may be configured to contact the underlying surface. The bottom of the foot may have an enlarged surface area that may be greater than a cross-sectional area of the assistant arm. For instance, the bottom of the foot may have an area that is greater than the cross-sectional area of the assistant arm by at least 1%, 3%, 5%, 10%, 15%, 20%, 25%, 30%, 35%, 40%, 45%, 50%, 60%, 70%, 80%, 90%, 100%, 120%, 150%, 200%, 250%, 300%, 400%, or 500%. The area of the bottom of the foot may be less than any of the values described, or may fall in a range between any two of the values described. The bottom of the foot may be an auxiliary support. The bottom of the foot may extend substantially perpendicular from a distal end of an arm, wherein the bottom of the foot may be configured to contact an underlying surface in a substantially parallel manner when the UAV is not in flight.

The bottom of the foot may include an extension that is disposed at a distal end of the arm. The bottom may evenly surround the distal end of the arm. Alternatively, the bottom may extend in one or more directions. The extension may extend on a side. The side may be a side opposing a side with the one or more propulsion units or a particular component of the propulsion units (e.g., rotor blades). The foot may extend in a way that avoids running into another object when the arm is transforming while the UAV is landing. Alternatively, the side may be a same side as a side with the one or more propulsion units, or a side substantially perpendicular to the side with the one or more propulsion units. The foot may extend to a side that may allow an extension of the foot to be adjacent to the one or more propulsion units. The foot may extend in a way that may protect the one or more propulsion units.

The surface of the bottom of the foot may be substantially perpendicular to a longitudinal axis passing through the assistant arm (e.g., second section of the assistant arm). The bottom of the foot may be coplanar with a plane that is perpendicular to the longitudinal axis of the second section of the assistant arm. Alternatively, the surface of the bottom of the foot may have any slant or angle relative to the longitudinal axis. For instance, the surface of the bottom of the foot may have an angle of at least 5, 10, 15, 30, 45, 60, 75, 90, 105, 120, 135, 150, 165, or 175. The surface of the bottom of the foot may have an angle less than any of the values described or falling in a range between any two of the values described. The bottom of the foot may have a fixed angle relative to the assistant arm (e.g., second section of the assistant arm). Alternatively, the bottom of the foot may have a changeable or variable angle relative to the assistant arm. The angle may change when a mechanical force is applied. For instance, if the UAV touches down on an underlying surface, the angle of the bottom of the foot may change to accommodate different angles of the underlying surface to ensure a stable grip. Some flexibility may be provided in the angle of the bottom of the foot. Alternatively, one or more actuators may cause an adjustment to an angle of the bottom of the foot.

The foot may include an attachment portion 374 that may be configured to connect to the rest of the assistant arm. The attachment portion may mechanically couple to the end of the assistant arm. The attachment portion may include a tunnel, opening, or pocket within which the end of the assistant arm may be inserted. A portion of the assistant arm may overlap with the attachment portion. The assistant arm may overlap on an inner surface, outer surface, or any combination thereof. The assistant arm may be secured to the attachment portion in any manner (e.g., mechanical fastener, adhesives, interlocking mechanisms, magnets, hook and loop connections, melting, soldering, or welding). The attachment portion may cover a distal end of an arm.

A foot supporting member 376 may optionally be provided on the foot. The foot supporting member may provide additional structural support for the bottom of the foot. The foot supporting member may prevent the bottom of the foot from flopping or rotating relative to the assistant arm. The foot supporting member may connect an extension of the bottom of the foot to the attachment portion. The foot supporting member may include one or more plates or ramps.

In some embodiments, the foot, or a component of the foot (e.g., bottom of the foot), may be formed from a malleable or high-friction material. The foot or the component of the foot may be formed from an elastomeric or shock reducing material. The foot may or may not be formed from the same material as the rest of the assistant arm. The bottom of the foot may have one or more features that may help reduce slip and/or increase resilience or shock reduction. For instance, the bottom of the foot may have bumps, protrusions, grooves, indentations, ridges, or any other features.

The foot may or may not be a separate piece from the rest of the arm. The foot may be formed from a piece that may be removable or separable from the rest of the arm. Alternatively, the foot may be integrally formed on the arm. In some embodiments, a distal end of the assistant arm (e.g., distal end of the second section) may be configured to contact an underlying surface while the UAV is not in flight. The distal end may function as a foot. The distal end may have a greater area than a cross-sectional area of the arm where the one or more propulsion units. The distal end may have a greater area than a cross-sectional area of the arm at a proximal end of the arm or at a proximal end of the second section.

Figure 4:
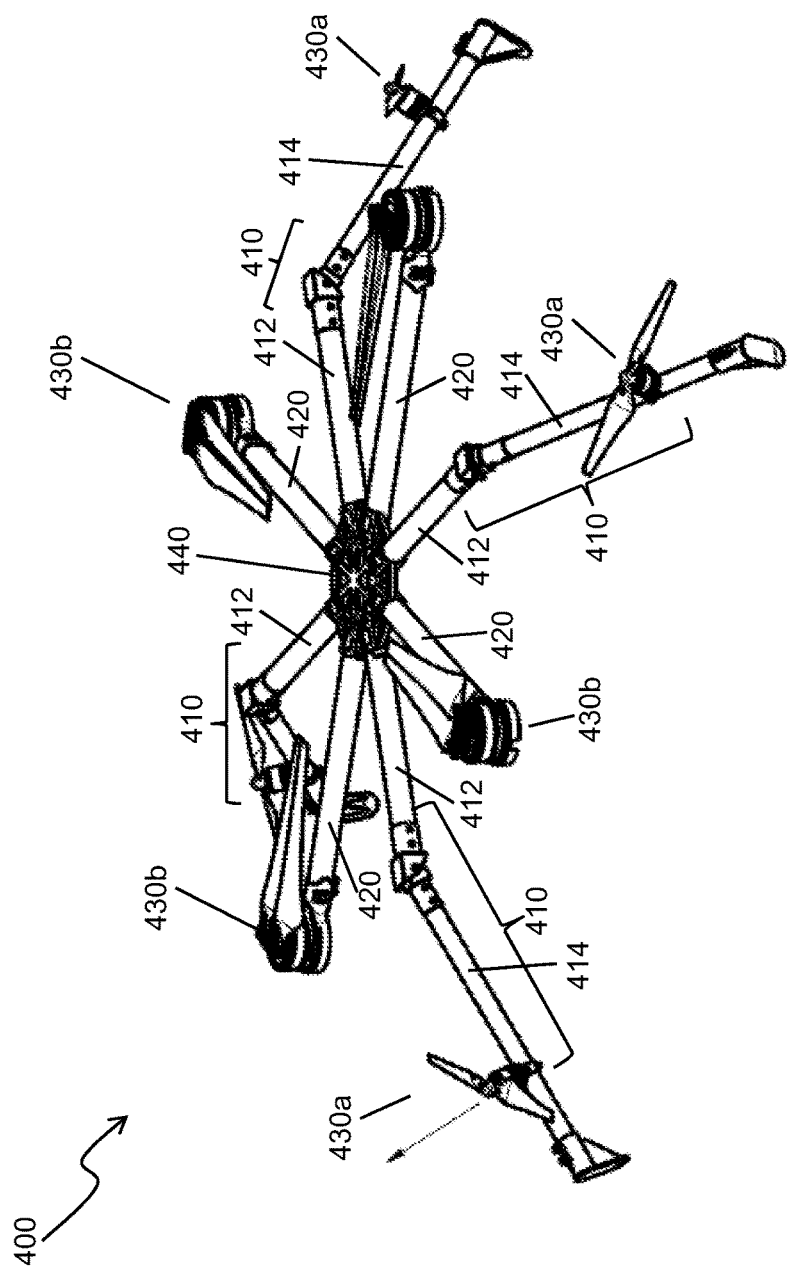
FIG. 4 provides an illustration of a UAV with transformable arms in a transition state, in accordance with embodiments of the invention.

FIG. 4 provides an illustration of a UAV with transformable arms in a transition state, in accordance with embodiments of the invention. The UAV 400 may include a UAV body 440 that may support one or more arms 410, 420. The arms may support one or more propulsion units 430a, 430b. The arms may include assistant arms 410 and main arms 420. The assistant arms may include a first section 312 and a second section 314.

The UAV may be capable of transforming between a flight configuration and a landing configuration, as previously described. The flight configuration may be effected while the UAV in flight and collected information using the payload. For instance, the flight configuration may be effected while the UAV is flying about and collecting images using a camera. The landing configuration may be effected when the UAV is no longer in flight. For instance, the landing configuration may be effected when the UAV is resting on an underlying surface. The landing configuration may be effected when the UAV is powered off.

The UAV may enter a transition state to change between the flight configuration and a landing configuration. For instance, when the UAV is taking off, the UAV may enter a transition state from the landing state. When the UAV is landing, the UAV may enter a transition state from the flight state. In some embodiments, the transition state may occur fairly quickly. For instance, the UAV may be within a transition state less than 3 minutes, 2 minutes, 1 minute, 45 seconds, 30 seconds, 20 seconds, 15 seconds, 10 seconds, 7 seconds, 5 seconds, 3 seconds, or 1 second. Alternatively, the transition state may last longer than any of the times provided, or fall within a range between any two of the times provided. The amount of time may be the same whether the UAV is transitioning into a flight configuration, or into a landing configuration, or may be different.

In some embodiments, while the UAV is in a transition state, the propulsion units 430*b* supported by the main arms 420 may be operating to provide lift for the UAV and keep the UAV stable at a desired location. For instance, if the UAV is landing, the UAV may approach a surface, and then make a determination to start the transition to the landing configuration. While the UAV is transforming into the landing configuration, the propulsion units of the main arm may keep the UAV substantially hovering above the surface or descending toward the surface in a controlled manner. Once the UAV has completely transitioned into the landing configuration, the UAV may be brought to rest on the underlying surface.

While the UAV is transitioning to the landing configuration, the propulsion units 430*a* supported by the assistant arms 410 may decrease or stop rotation. This may permit the assistant arms to fold downward. In some instances, the arms may fold downward with aid of gravity, which is no longer sufficiently counterbalanced by the lift generated by the propulsion units of the assistant arms. Alternatively, one or more actuators may aid in causing the arms to fold downwards.

While the UAV arms are folding downward, the first section 412 of the assistant arms may remain at the same orientation while the second section 414 may fold downward gradually in the transition state. The second section may change orientation relative to the first section. Similarly, the propulsion units supported by the second section may change orientation relative to the first section. The propulsion units may change orientation with the second section.

If the UAV is taking off, the UAV may lift off a surface, and then make a determination to start the transition to the flight configuration. While the UAV is transforming into the flight configuration, the propulsion units 430*b* of the main arm 420 may keep the UAV substantially hovering above the surface or ascending away from the surface in a controlled manner. Once the UAV has completely transitioned into the flight configuration, the UAV may continue on its flight.

While the UAV is transitioning to the flight configuration, the propulsion units 430*a* supported by the assistant arms 410 may start or increase rotation. This may permit the assistant arms to fold upward. In some instances, the arms may fold upwards with aid of the lift force generated by the propulsion units, which may be sufficiently great to counterbalance the effects of gravity. Alternatively, one or more actuators may aid in causing the arms to fold upwards and straighten out.

While the UAV arms are folding upward, the first section 412 of the assistant arms may remain at the same orientation while the second section 414 may fold upward gradually in the transition state. The second section may change orientation relative to the first section. Similarly, the propulsion units supported by the second section may change orientation relative to the first section. The propulsion units may change orientation with the second section.

The UAV may make a determination to transforming into a landing configuration from a flight configuration when a user provides an input for the UAV to land. The UAV may begin the transformation to the landing configuration as soon as the user provides the input. Alternatively, the UAV may start transforming into the landing configuration after a predetermined period of time has passed. The UAV may start the transformation based on information from one or more sensors on-board the UAV. The sensors may gather information indicative of the UAV altitude relative to an underlying surface. The sensors may cause the UAV to transform to a landing configuration when the UAV is at or beneath a predetermined altitude relative to the underlying surface. The sensors may gather information indicative of UAV motion characteristics (e.g., speed, acceleration, direction). For instance, if the UAV is moving downward at a rapid velocity, the landing configuration may start sooner (or at a higher altitude) relative to if the UAV is moving downward as a lesser velocity. Environmental conditions, such as a wind conditions may be taken into account in determining when to start the transformation to the landing configuration. In some embodiments, a user instruction for the UAV to land may initiate an automated or semi-automated sequence that may cause the UAV the UAV to transform into the landing configuration based on sensor data. In some instances, the UAV may make an automated determination to land with aid of one or more processors without requiring user input, and may automatically make the determination to transform into a landing configuration.

The UAV may make a determination to transforming into a flight configuration from a landing configuration when a user provides an input for the UAV to take off. The UAV may begin the transformation to the flight configuration as soon as the user provides the input. Alternatively, the UAV may start transforming into the flight configuration after a predetermined period of time has passed. The UAV may start the transformation based on information from one or more sensors on-board the UAV. The sensors may gather information indicative of the UAV altitude relative to an underlying surface. The sensors may cause the UAV to transform to a flight configuration when the UAV is at or above a predetermined altitude relative to the underlying surface. In some embodiments, a user instruction for the UAV to take off may initiate an automated or semi-automated sequence that may cause the UAV the UAV to transform into the flight configuration based on sensor data. In some instances, the UAV may make an automated determination to take off with aid of one or more processors without requiring user input, and may automatically make the determination to transform into a flight configuration. When a user provides an instruction for the UAV to take off a separate user instruction may or may not be required to initiate the transformation to a flight configuration.

The speed at which a UAV transforms between a flight configuration and landing configuration may be substantially constant. Alternatively, the speed at which the UAV transforms may be variable. The speed at which the UAV transforms may be controlled depending on one or more circumstance. The circumstance may be sensed with aid of one or more sensors. For instance, if the UAV is rapidly descending, the amount of time to transform to a landing configuration may be reduced compared to if the UAV is descending slowly. In another instance, if the UAV is capturing images immediately during take-off, the amount of time to transform to a flight configuration may be reduced compared to if the UAV were not capturing images.

The UAV may change configuration with aid of one or more actuators. The actuators may be actuators for the propulsion units of the UAV. The actuators may be actuators that actively control a configuration of a joint of the UAV. The actuators may be controlled by a flight controller of the UAV. The flight controller may be supported by a central body of the UAV. The flight controller may provide a signal that may affect the one or more actuators. The signal may be generated on the flight controller. The signal may be generated in response to a command from a user terminal remote to the UAV. The signal may be generated in response to a signal from one or more sensors on-board the UAV. The signal may be generated on the flight controller without requiring user input or active user control.

Figure 5:
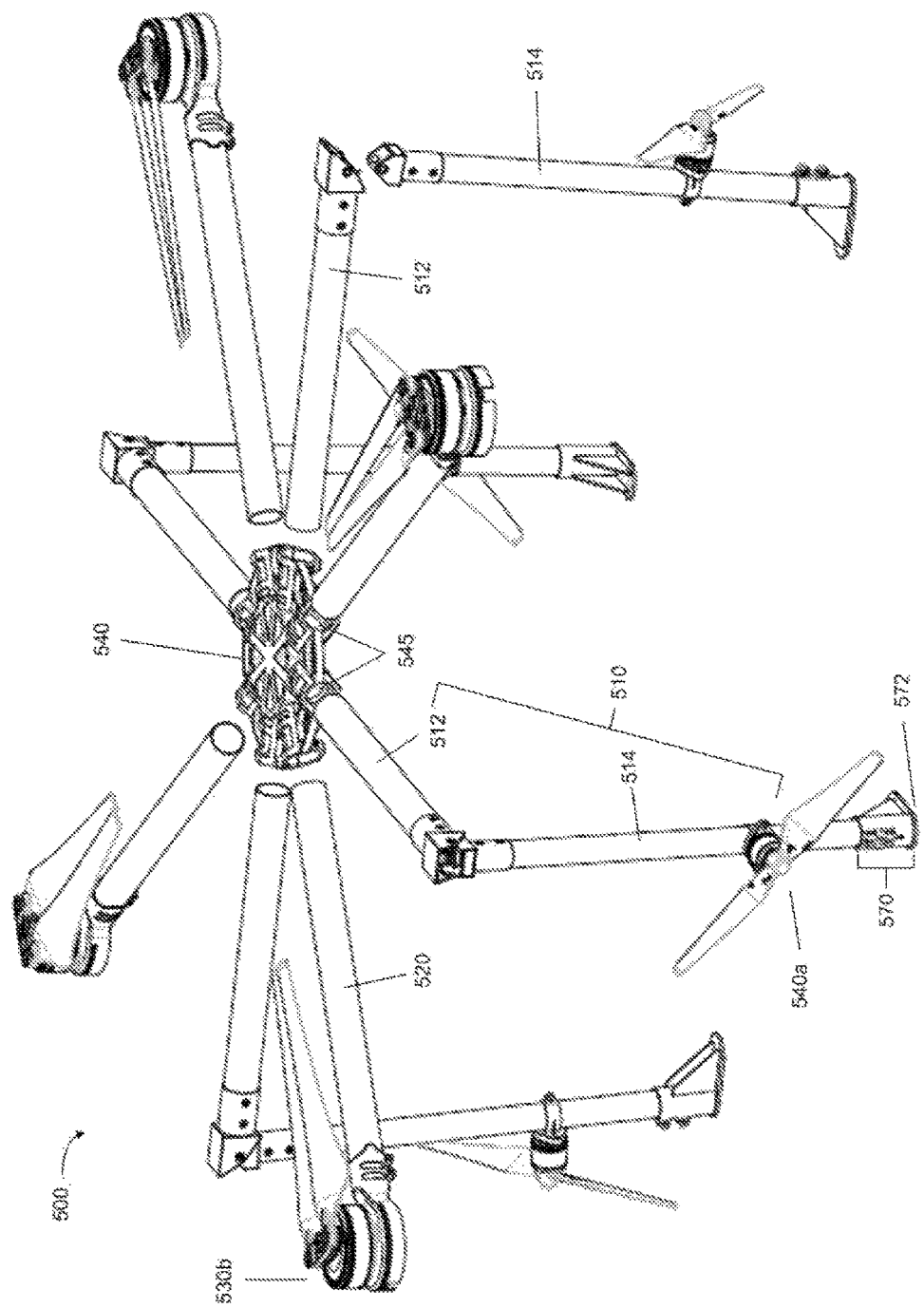
FIG. 5 provides an additional illustration of a UAV with transformable arms, in accordance with embodiments of the invention.

FIG. 5 provides an additional illustration of a UAV with transformable arms, in accordance with embodiments of the invention. The UAV 500 may include a UAV body 540 that may support one or more arms 510, 520. The arms may support one or more propulsion units 530a, 530b. The arms may include assistant arms 510 and main arms 520. The assistant arms may include a first section 512 and a second section 514.

The illustration may show a UAV in a landing configuration. While in a landing configuration, a second section of the assistant arms may be non-co-linear with a first section of the assistant arms. Optionally, the first and second sections may be substantially orthogonal to one another (or within plus or minus 0.5 degrees, 1 degree, 3 degrees, 5 degrees, 7 degrees, or 10 degrees of being orthogonal relative to one another) when in a landing configuration. The first section of an assistant arm may be have a substantially lateral (e.g., horizontal) orientation while the second section of the assistant arm may have a substantially vertical orientation. The second section of the assistant arm may be substantially orthogonal to the direction of gravity while the first section of the assistant arm may be substantially parallel to the direction of gravity.

The UAV may be resting on a foot 570 of each assistant arm while in a landing configuration. The foot may have a bottom surface 572 that may contact an underlying surface. The bottom surface may be oriented to match a contour of the underlying surface. The bottom surface may be substantially orthogonal (or within plus or minus 0.5 degrees, 1 degree, 3 degrees, 5 degrees, 7 degrees, or 10 degrees of being orthogonal) relative to the orientation of the second section of the assistant arm.

In some instances, FIG. 5 may be similar to FIG. 3, where an exploded view is provided where the arms and/or sections of the arms are separated. In some embodiments, a central body may have one or more interfaces 545 that may form the connection with the arms. The interfaces for assistant arms and the main arms may be the same. Alternatively, they may be different (e.g., have different shape or dimension). In some embodiments, only main arms may fit with main arm interfaces of the central body and only assistant arms may fit with assistant arm interfaces of the central body. Alternatively, main arms and assistant arms may interchangeably fit with any of the interfaces of the central body. The interfaces may optionally include an opening or hollow portion within which the arms may be inserted. The arms may be inserted into the interfaces and secured with aid of adhesives, welding, soldering, or melting. Alternatively, the arms may be inserted into the interfaces and secured with aid of mechanical connections. For instances, the arms may be screwed into the interfaces. Snack and lock mechanisms, clamps, grooves, press-fits, magnets, or other fastening mechanisms may be used. The arms may be permanently attached to the central body, or may be removable relative to the central body without damaging the central body or the arms.

A first section 512 and a second section 514 of an assistant arm may be separable from one another. The first and second sections may be separated from one another without damaging the first section or the second section. The first section and second section may be configured to move relative to one another. The first section and/or the second section may pivot about a pivot point in a joint connecting the first and second sections.

Figure 6:
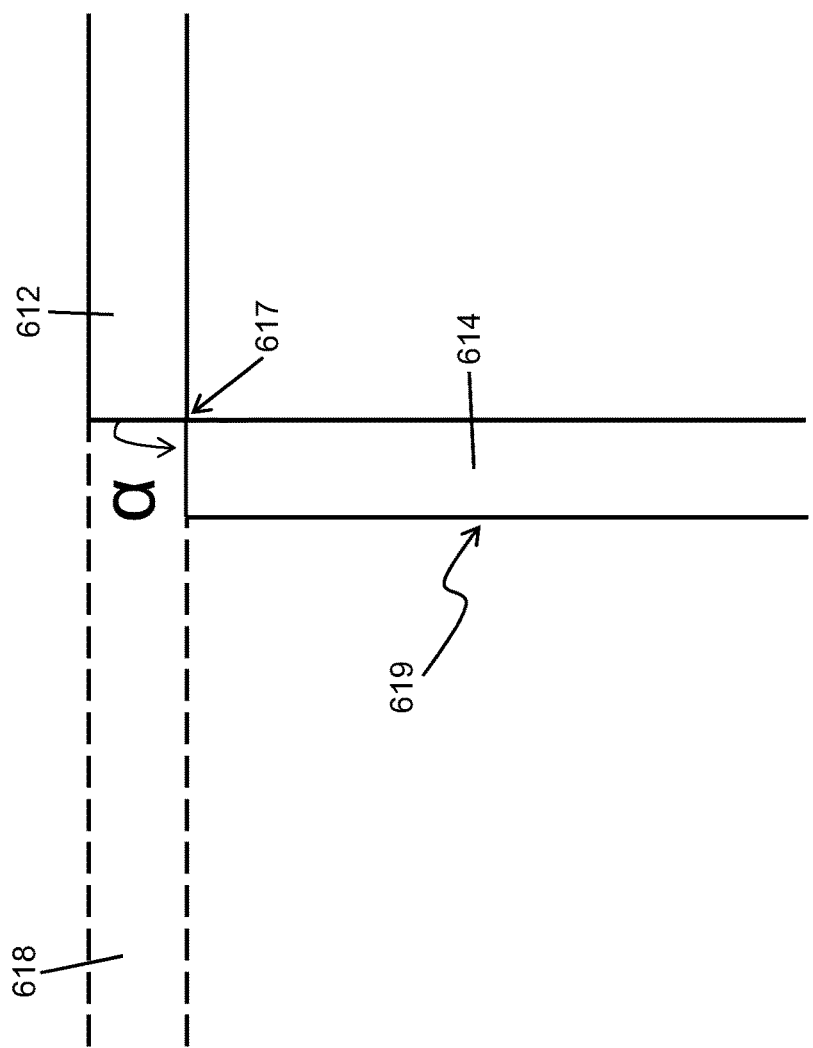
FIG. 6 shows a schematic view of a first section and a second section of a transformable arm, in accordance with embodiments of the invention.

FIG. 6 shows a schematic view of a first section and a second section of a transformable arm, in accordance with embodiments of the invention. A first section 612 and a second section 614 may be configured so that at least one of the sections may move relative to another section. The second section may be provided in a first position 618 when the UAV is in a flight configuration and a second position 619 when the UAV is in a landing configuration. An angle α may indicate the degree between the first and second sections.

When the second section of a transformable arm is in the first position, the second section may be substantially co-linear with the first-section. The angle α may be zero or close to zero. The angle between the first and second sections may be less than or equal to about 5 degrees, 3 degrees, 2 degrees, 1 degree, 0.5 degrees, 0.3 degrees, or 0.1 degree.

When the second section of a transformable arm is in the second position, the second section may be non-co-linear with the first section. The angle α may be 90 degrees or close to 90 degrees. The angle between the first and second sections may be greater than or equal to about 10 degrees, 20 degrees, 30 degrees, 40 degree, 45 degrees, 50 degrees, 60 degrees, 70 degrees, 80 degrees, 85 degrees, 87 degrees, 89 degrees, 90 degrees, 93 degrees, 95 degrees, or 100 degrees.

The range of angular change between the second section of the arm being in the first section and the second section may be at least about 5 degrees, 10 degrees, 20 degrees, 30 degrees, 40 degree, 45 degrees, 50 degrees, 60 degrees, 70 degrees, 80 degrees, 85 degrees, 87 degrees, 89 degrees, 90 degrees, 95 degrees, 100 degrees, or 105 degrees.

The first section may remain connected to the second section while the angle of the second section is changing relative to the first section. The first section may remain connected to the second section with aid of one or more joints. The second section may change position by pivoting around a pivot point 617 which may be part of the connection between the first and second sections. The pivot point may be on a substantially lower surface of the transformable arm. The pivot point may be within a lower half of the transformable arm. The pivot point may be on or near a side facing the ground when the UAV is in flight.

Figure 7:
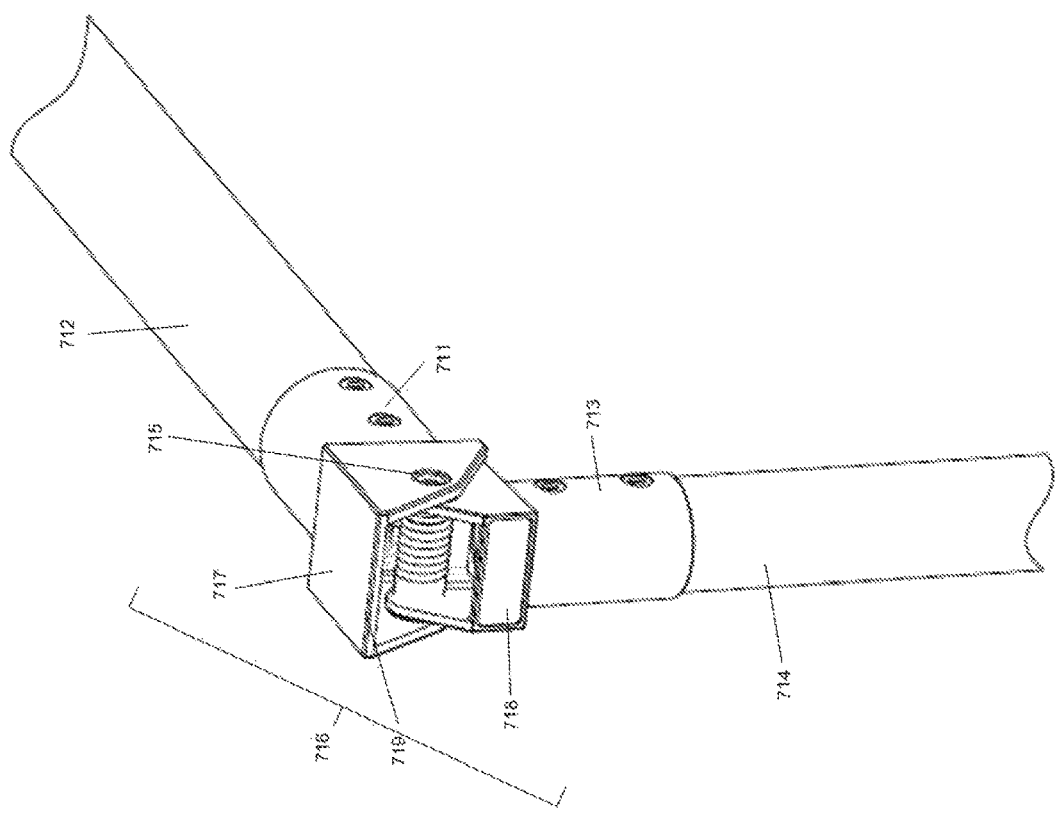
FIG. 7 provides an illustration of a joint between a first section and a second section of a transformable arm, in accordance with embodiments of the invention.

FIG. 7 provides an illustration of a joint between a first section and a second section of a transformable arm, in accordance with embodiments of the invention. The first section 712 and a second section 714 of a transformable arm may be connected to one another with aid of a joint 716. The joint may include a first interface 711 that may connect to the first section of the transformable arm and a second interface 713 that may connect to the second section of the transformable arm. The joint may include a pivot point 715 and one or more limiting structures 717, 718 that may limit the movement of the second section relative to the first section.

The joint 716 may include portions that may be connected to one another. The portions of the joint may optionally be separable from one another. One or more portions of the joint may be separable relative to one another without damaging the joint. One or more portions of the joint may be movable relative to one another. One or more portions of the joint may be movable (e.g., rotatable) relative to one another about a pivot point 715.

The joint may include a first interface 711 and a second interface 713. The first and second interfaces may be movable relative to one another. The first and second interface may move (e.g., rotate) relative to one another about a pivot point 715. The first and second interfaces may have the same configuration (e.g., shape, dimension) relative to one another. Alternatively, they may have different configurations (e.g., different shape and/or dimension) relative to one another.

The first and second interfaces may connect to respective sections of a transformable arm. The first interface may overlap with at least a portion of a surface of a first section of a transformable arm. The first interface may cover an outer surface of an end of the first section. Alternatively, a portion of first section may cover an outer surface of the first interface. In one example, the first interface may include a hollow portion within which an end of the first section may be inserted. In some instances, the first section may be press-fit into the first interface, attached to the first interface with aid of an adhesive, welded to the first interface, screwed into the first interface, attached to the first interface with aid of a magnet, attached to the first interface with aid of a mechanical fastener (e.g., bolts, rivets, screws, clamps, locking mechanisms, grooves, sliding features, keys, or any other type of mechanism). The cross-sectional shape of the first interface may match the cross-sectional shape of the first section of the transformable arm. For instance, if the first section of the transformable arm has a circular cross-section, the first interface may have a corresponding circular cross-section. The first section may have a hollow tubular shape. The inner surface of the first interface may have a diameter that is about equal to or greater than the diameter of the outer surface of the first section. In some instances, the diameter of the inner surface of the first interface may be slightly less than the diameter of an outer surface of the first section, to allow a tight connection when the first section is inserted into the first interface. The first interface and the first section may overlap by any length. For instance, about at least 0.5 cm, 1 cm, 1.5 cm, 2 cm, 2.5 cm, 3 cm, 4 cm, 5 cm, 7 cm, or 10 cm of the end of the first section may be inserted into the first interface.

Similarly, the second interface may overlap with at least a portion of a surface of a second section of a transformable arm. The second interface may cover an outer surface of an end of the second section. Alternatively, a portion of second section may cover an outer surface of the second interface. In one example, the second interface may include a hollow portion within which an end of the second section may be inserted. In some instances, the second section may be press-fit into the second interface, attached to the second interface with aid of an adhesive, welded to the second interface, screwed into the second interface, attached to the second interface with aid of a magnet, attached to the second interface with aid of a mechanical fastener (e.g., bolts, rivets, screws, clamps, locking mechanisms, grooves, sliding features, keys, or any other type of mechanism). The cross-sectional shape of the second interface may match the cross-sectional shape of the second section of the transformable arm. For instance, if the second section of the transformable arm has a circular cross-section, the second interface may have a corresponding circular cross-section. The second section may have a hollow tubular shape. The inner surface of the second interface may have a diameter that is about equal to or greater than the diameter of the outer surface of the second section. In some instances, the diameter of the inner surface of the second interface may be slightly less than the diameter of an outer surface of the second section, to allow a tight connection when the second section is inserted into the second interface. The second interface and the second section may overlap by any length. For instance, about at least 0.5 cm, 1 cm, 1.5 cm, 2 cm, 2.5 cm, 3 cm, 4 cm, 5 cm, 7 cm, or 10 cm of the end of the second section may be inserted into the second interface.

The interfaces of the joint may be connected to respective limiting structures of the joint. A first interface may be connected to a first limiting structure. The first interface and the first limiting structure may remain substantially stationary relative to one another while the first and second interfaces may move relative to one another. The first interface and first limiting structure may be formed from separate pieces or a single integral piece. A second interface may be connected to a second limiting structure. The second interface and the second limiting structure may remain substantially stationary relative to one another while the first and second interfaces may move relative to one another. The second interface and second limiting structure may be formed from separate pieces or a single integral piece.

The first and second limiting structures may be formed from separate pieces. The first and second limiting structures may be movable (e.g., rotatable) relative to one another about a pivot point. The first and second limiting structures may overlap one another. In some instances, a portion of the second limiting structure may be covered by a portion of the first limiting structure. A portion of the first limiting structure may or may not be covered by a portion of a second limiting structure. The first and second limiting structures may prevent rotation of the first and second sections of the arms from exceeding a pre-set angle. For instance, the first and second limiting structures may prevent the second section of the arm from folding up past being parallel to the first section of the arm. A limiting structure (comprising the first and second limiting structures) may prevent the second section from folding upwards past being co-linear with the first section. The limiting structure may cause the most folded up position of the second section of the arm to be one where the second section of the arm is substantially parallel to (e.g., co-linear with) the first section. Thus, when a UAV is transforming into a flight configuration, the movement of the second section of an assistant arm may be limited to a configuration where the second section is an extension of the first section. This may allow one or more propulsion units supported by the second section to generate lift for the UAV without flopping upwards.

In one example, the first limiting structure may have an overhanging portion 719 that may serve to block further rotation of the second limiting structure. The limiting structure may be formed from a substantially strong material that will not deform or permit the second section to rotate past its designated configuration.

The joint may include sections that may pivot about a pivot point 715. The pivot point may include an axis of rotation that may pass through the joint. The axis of rotation may intersect with two connection pivot points on opposing sides of the joint. The axis of rotation may be at an intersection point between an axis extending through a center of the first section along the length of the first section and an axis extending through a center of the second section along the length of the second section. Alternatively, the axis of rotation may insect only one of the axes extending along the first section or the second section, or may not intersect any of the axes. The axis of rotation may be beneath an axis extending through the first section and/or beneath an axis extending through the second section.

Figure 8:
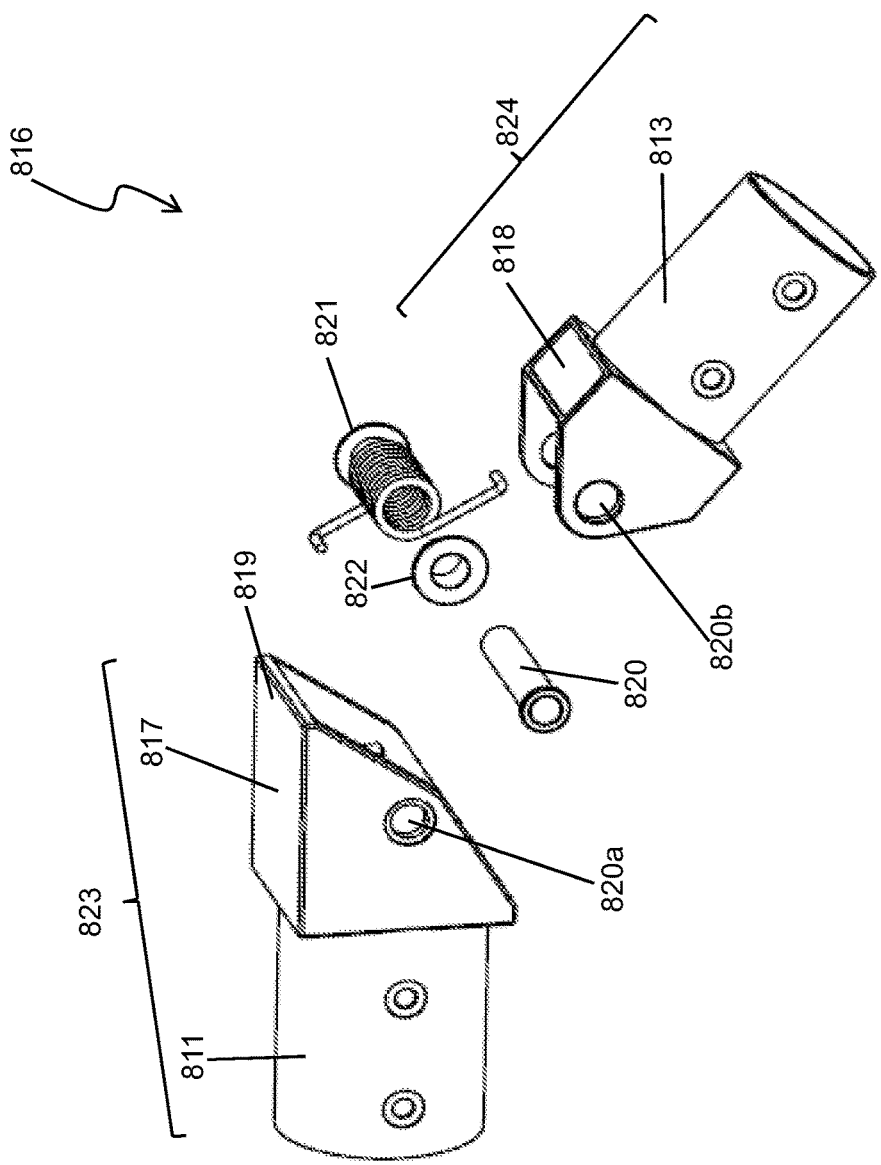
FIG. 8 provides an exploded view of an example of a joint between a first section and a second section of a transformable arm, in accordance with embodiments of the invention.

FIG. 8 provides an exploded view of an example of a joint between a first section and a second section of a transformable arm, in accordance with embodiments of the invention.

The joint 816 may include a first arm mounting seat 823 and a second arm mounting seat 824. The first and second arm mounting seats may move relative to one another about a rotating axis. A pin 820 may be placed at the rotating axis. A biasing mechanism, such as a torsional spring 821 may be provided about the pin and a sheath 822 may be provided.

The first arm mounting seat 823 may include a first interface 811 and a first limiting structure 817. The first interface and first limiting structure may have any characteristic as described elsewhere herein. The first limiting structure may include an overhanging portion 819. The first arm mounting seat may be a fixed arm mounting seat that may remain substantially stationary relative to a first section of an assistant arm. The fixed arm mounting seat may remain substantially stationary relative to a UAV body.

The second arm mounting seat 824 may include a second interface 813 and a second limiting structure 818. The second interface and second limiting structure may have any characteristic as described elsewhere herein. The second arm mounting seat may be a moving arm mounting seat that may move relative to a first section of an assistant arm. The moving arm mounting seat may move relative to a UAV body.

As previously described the one or more limiting structures 817, 818 may limit a movement of a first and second section of an arm. The movement may be limited in an upwards direction. For instance, the second section may be prevented from rotating above a predetermined angle. This may be provided when using one or more propulsion units on the second section to provide lift to the UAV. Preventing the second section from over-extending may allow the propulsion units to provide lift without rotating and becoming unstable. In some instances, the movement may be limited in a downwards and/or inwards direction. For instance, the second section may be prevented from rotating downwards and/or inwards beyond a predetermined angle. This may be useful when the UAV is landing. Limiting the inward rotation of the second section of the arm may prevent the legs from collapsing and may provide a stable landing configuration. In some embodiments, the limiting structure may limit rotation in both the upwards and downwards/inwards directions. The limiting structure may permit autolocking of the arms (e.g., preventing them moving beyond certain configurations), which may improve stability and reliability of the assistant arms when they are acting as legs. The limiting structure may prevent the first section or the second section from exceeding a preset configuration.

A rotating axis may pass through a length of a pin 820. The pin may be connected to both the first and second arm mounting seats. The pin may pass through one or more openings 820a in a first arm mounting seat (e.g., a first limiting structure of the first arm mounting seat) and one or more openings 820b in a second arm mounting seat (e.g., a second limiting structure of the second arm mounting seat. An axis of rotation may pass through the openings in the first and second arm mounting seats. A sheath 822 may aid in the connection of the pin with the first and second arm mounting seats. The pin and/or sheath may be formed from a metal or metal alloy. For instance, the pin and/or sheath may be formed from copper, brass, steel, iron, silver, titanium, nickel, aluminum, or any combination or alloy thereof.

A biasing mechanism may be provided at the joint. The biasing mechanism may be within the joint. The biasing mechanism may be surrounded at least partially by the first arm mounting seat and/or second arm mounting seat. The biasing mechanism may surround a rotating axis. The biasing mechanism may exert a force that biases a position of the second section of an arm relative to the first section of the arm. The biasing mechanism may bias the second section to be at a different orientation relative to the first section. The force may bias the position of the second section in a folded down position. The force may bias the position of the second section to a landing configuration. An advantage of biasing the position to a landing configuration may be that the assistant arms may be able to support the UAV as a whole and not slide toward one side. When the arms are acting as legs, the bias of angling them downwards may cause them to be evenly arranged and provide stability to the landed UAV structure. Alternatively, the force may bias the position of the second section in a folded up position. The force may bias the position of the second section to a flight configuration. The biasing mechanism may bias the second section to be at the same orientation relative to the first section.

The biasing mechanism may exert a biasing force that may remain substantially constant regardless of the position of the second section relative to the first section. Alternatively, the biasing force may be variable. The biasing force may be variable depending on a position of the second section relative to the first section. For instance, the biasing force may be greater when the position of the second section is further from the biased direction, and may become less when the position of the second section is closer to the biased direction. In some embodiments, the biasing force may be variable dependent on a user input from a remote device, or user manipulation of the biasing mechanism or other component of the UAV.

In one example, the biasing mechanism may be a torsional spring 821. Any other type of biasing mechanism may be used, which may include a rotational bias. The torsional spring may be a reciprocating torsional spring. The torsional spring may surround a pin 820. The torsional spring may provide a bias force for the assistant arms to be in a landing configuration. The second section of an assistant arm may be biased to be folded downward in a landing configuration. Optionally, a limiting structure may prevent the second section from being folded downwards/inwards past a pre-set configuration. When a UAV is transforming to a flight configuration, the force provided by the torsional spring may be counterbalanced by a force exerted by the propulsion units, as described in greater detail elsewhere herein. In alternative embodiments, the torsional spring may provide a bias force for the assistant arms to be in a flight configuration. Gravity may be sufficient to overcome the bias force when the UAV is landing, and the bias force may optionally aid the lift provided by the propulsion units when the UAV is flying.

The biasing mechanism may be used in conjunction with the limiting structure to provide a stable limit to the configurations that the assistant arms may take. This may increase reliability and stability of the UAV. The limiting structure may comprise the biasing mechanism, such as a torsional spring.

Figure 9:
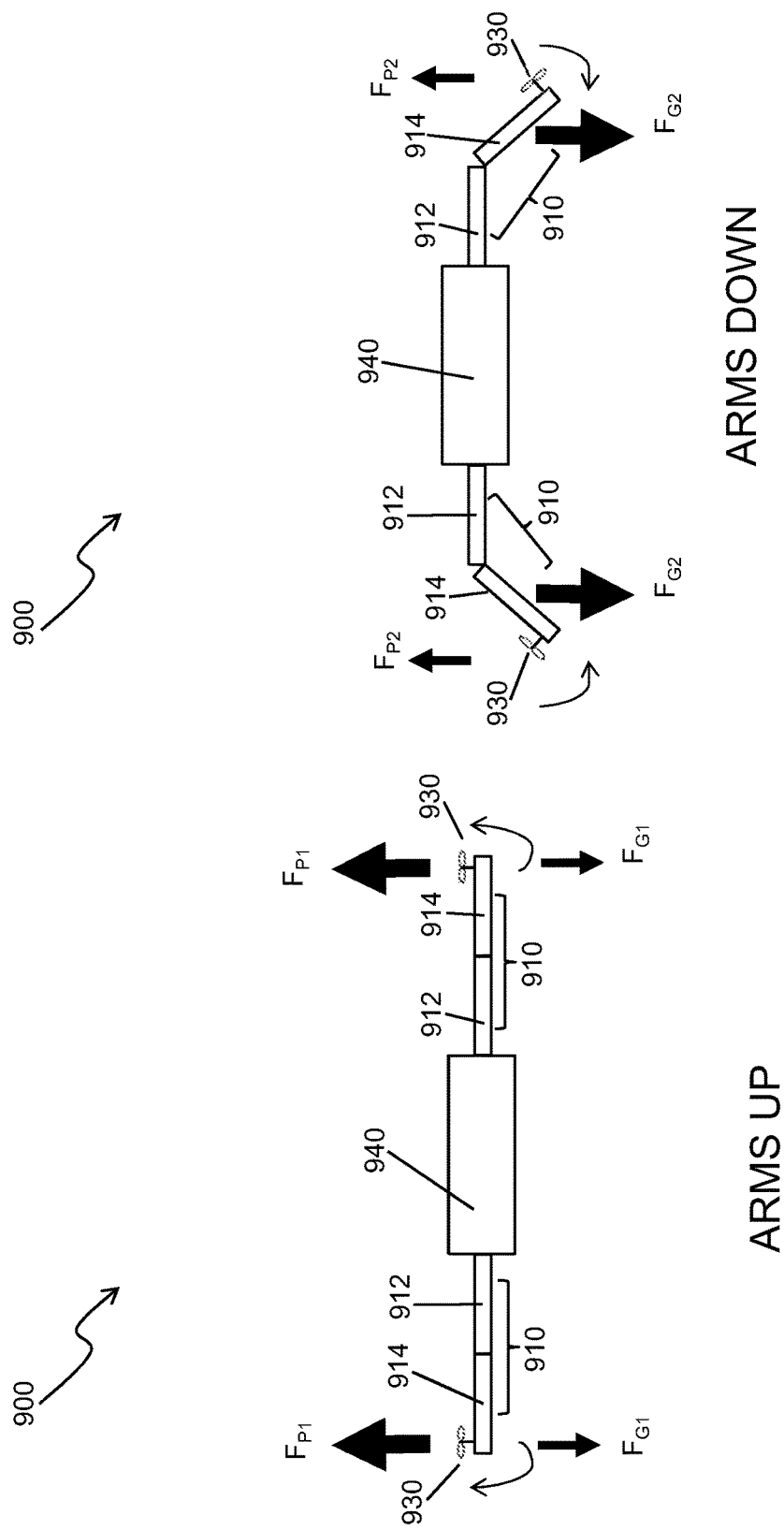
FIG. 9 provides a schematic of force interactions that may affect transformation of a transformable arm, in accordance with embodiments of the invention.

FIG. 9 provides a schematic of force interactions that may affect transformation of a transformable arm, in accordance with embodiments of the invention. A UAV 900 may be capable of transforming between an "arms up" configuration and an "arms down" configuration. The arms up configuration may correspond to a flight configuration of the UAV and the arms down configuration may correspond to a landing configuration of the UAV. The UAV may include a central body 940 with one or more arms 910 supported by the central body. The one or more arms may include a first section 912 and a second section 914. One or more propulsion units 930 may be supported by the arm. The UAV may optionally include other arms that may have other configurations, but are not included in FIG. 9 for simplicity.

An arm 910 of a UAV may extend from the central body 940. The arm may be formed of a single section or may be formed at multiple sections, such as a first section (e.g., proximal section) 912 and a second section (e.g., distal section) 914. The arm may be capable of transforming between different configurations, such as an arms up and arms down configuration. In some embodiments, the entirety of the arm may move relative to the central body. For instance, the entirety of the arm may pivot vertically relative to the central body. In one example, the arm may be formed from a single piece or multiple pieces that may pivot relative to the central body (e.g., a first section may pivot relative to the central body where the first section meets the central body). Alternatively, a section of the arm may move relative to the central body while a section of the arm is stationary relative to the central body. For instance, the first section of the arm may be stationary relative to the central body while the second section of the arm may be movable (e.g., pivot vertically) relative to the central body.

The first section of the arm may have any length relative to the second section of the arm. For example, the first section may have a greater length than the second section, the same length as the second section, or a smaller length than the second section. The first section length may be less than 10%, 30%, 50%, 75%, 100%, 150%, 200%, 300%, 400%, or 500% the length of the second section. The first section length may be greater than the first section length by any of the percentages provided, or may be fall within a range between any two of the percentages provided.

One or more propulsion units 930 may be supported by the arms. Zero, one, two, or more propulsion units may be supported by the second section. Zero, one, two, or more propulsion units may be supported by the first section. In one example, the first section may not support any propulsion units while the second section may support a propulsion unit. Rotation of a propulsion unit may generate a lift force. The lift force may be substantially perpendicular to an orientation of a rotor blade. The lift force may be substantially perpendicular to an orientation of a section of the arm supporting the propulsion unit. For instance, a force form a propulsion unit may be substantially perpendicular to the orientation of the second section when the propulsion unit is carried by the second section. The degree of force from the propulsion unit may depend on the speed at which the rotor blades are rotating. For instance, the greater the speed of the rotation, the greater the force generated by the propulsion units.

A force of gravity may be exerted on the UAV. The force of gravity may be exerted on the components of the UAV, such as the central body of the UAV, arms of the UAV (e.g., sections of arms of the UAV), or propulsion units of the UAV.

In some embodiments, a first section 912 may remain stationary relative to a UAV body 940 while a second section 914 may move relative to the UAV body. The second section may move between an arms up configuration where the second section is substantially co-linear with the first section and an arms down configuration where the second section is not substantially co-linear with the first section (e.g., may be substantially orthogonal to the first section). The second section may move between the different arm configurations with aid of the one or more propulsion units. The one or more propulsion units may include actuators and/or rotor blades. The second section may move between the different arm configurations based on the actuators and/or rotor blades.

As previously provided, the propulsion units may generate a force. The force may be a lift force dependent on the actuation of the actuators and/or rotation of the rotor blades. When moving to an arms up configuration, a vertical component of the force generated by the propulsion units $F_{P1}$ may be greater than a force of gravity $F_{G1}$ on the second section of the arm (e.g., $F_{P1} > F_{G1}$). This may cause the second section of the arm to rotate upwards. The speed at which the arm rotates upwards may depend on how much greater the force from the propulsion units are relative to the force of gravity. The propulsion units may rotate faster to raise the arms more quickly. The second section of the arm may rotate upwards until limited by a limiting structure of the arm (e.g., at the joint of the arm). Then the vertical component of the force from the propulsion units may aid in generating lift for the UAV as a whole. Thus, the propulsion units may rotate at a threshold speed to cause the second section of the arms to lift up.

When moving to an arms down configuration, a vertical component of the force generated by the propulsion units $F_{P2}$ may be less than a force of gravity $F_{G2}$ on the second section of the arm (e.g., $F_{P2} < F_{G2}$). The speed at which the arm rotates downwards may depend on how much greater the force of gravity is relative to the force from the propulsion unit. The propulsion units may stop or reduce rotation more rapidly to lower the arms more quickly. In some instances, the propulsion units may stop rotating altogether. This may cause the second section of the arm to rotate downwards. The second section of the arm may rotate downwards until limited by a limiting structure of the arm (e.g., at the joint of the arm), or until dangling vertically due to the force of gravity. Then the second sections of the arms may be used as legs when the UAV is landing on a surface. The legs may be configured to bear weight of the UAV when the UAV is landed on the surface. Thus, the propulsion units may slow down rotation or stop rotating altogether to cause the second section of the arms to fall downwards.

In some embodiments, the force of gravity on the second section of the arm may be substantially the same for the arms up and arms down configuration (e.g., $F_{G1} = F_{G2}$). The vertical component of the force generated by the propulsion units may be different between the arms up and the arms down configuration. The vertical component of the force generated by the propulsion units may be greater in an arms up configuration than an arms down configuration (e.g., $F_{P1} > F_{P2}$).

Optionally, a biasing mechanism may be provided on the arm. The biasing mechanism may be provided at a joint connecting the first and second sections of the arm. In one example, the biasing mechanism may exert a force biasing the second section to the arms down configuration. In order for the arms to be raised to an arms up configuration, the vertical component of the force from the propulsion units may need to be greater than the force of gravity plus the vertical component of the biasing force (e.g., $F_{P1} > F_{G1} + F_B$). In order for the arms to be lowered to an arms down configuration, the vertical component of the force from the propulsion units may need to be less than the force of gravity plus the vertical component of the biasing force (e.g., $F_{P2} < F_{G2} + F_B$).

In alternative embodiment, the biasing mechanism may exert a force biasing the second section to an arms up configuration. In order for the arms to be raised to an arms up configuration, the vertical component of the force from the propulsion units plus the vertical component of the biasing force may need to be greater than the force of gravity (e.g., $F_{P1}+F_B>F_{G1}$). In order for the arms to be lowered to an arms down configuration, the vertical component of the force from the propulsion units plus the vertical component of the biasing force may need to be less than the force of gravity (e.g., $F_{P2}+F_B>F_{G2}$).

The biasing force may optionally be the substantially the same between the arms up and arms down configurations. Alternatively, the biasing force may be different. The biasing force may optionally be greater when moving to from an arms up to an arms down configuration, or vice versa.

Thus, the arms may be able to change configuration based on operation of one or more propulsion units. The arms may be configured to transform between an arms up (e.g., flight) configuration and an arms down (e.g., landing) configuration in response to operation of the one or more propulsion units. The arms may change configuration depending on a speed of rotation of one or more rotatable components of the propulsion units. For instance, the arms may change configuration depending on a speed of rotation of an actuator and/or rotor blade of the propulsion units. Adjusting a speed of rotor blades may affect whether an arm is in a flight configuration or a landing configuration. A greater speed of rotation above a threshold may cause the arm to be in a flight configuration, while a slower speed of rotation beneath the threshold may cause the arm to be in a landing configuration. The threshold may be static or variable.

In alternative embodiments of the invention, one or more actuators may be provided within the arms themselves. For instance, an actuator may be provided at a joint of the arm. Alternatively, the actuator may be provided in the UAV body or another portion of the UAV but may control actin of the joint of the arm. The actuators may optionally control the joint configuration to control movement of the second section relative to the first section. An active actuation mechanism may be provided that may actively control the orientation of the second section relative to the first section. At least one of the first section or the second section may be configure to change orientation relative to one another at the joint with aid of one or more actuators. The one or more actuators may respond to a signal generated on a flight controller of the UAV. The actuators may be actuators that actively control joint configuration or actuators of the propulsion units.

The systems, devices, and methods described herein can be applied to a wide variety of movable objects. As previously mentioned, any description herein of an aerial vehicle may apply to and be used for any movable object. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

In some embodiments, a UAV can include a propulsion system having a plurality of rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object).

In some embodiments, the load includes a payload. The payload can be configured not to perform any operation or function. Alternatively, the payload can be a payload configured to perform an operation or function, also known as a functional payload. For example, the payload can include one or more sensors for surveying one or more targets. Any suitable sensor can be incorporated into the payload, such as an image capture device (e.g., a camera), an audio capture device (e.g., a parabolic microphone), an infrared imaging device, or an ultraviolet imaging device. The sensor can provide static sensing data (e.g., a photograph) or dynamic sensing data (e.g., a video). In some embodiments, the sensor provides sensing data for the target of the payload. Alternatively or in combination, the payload can include one or more emitters for providing signals to one or more targets. Any suitable emitter can be used, such as an illumination source or a sound source. In some embodiments, the payload includes one or more transceivers, such as for communication with a module remote from the movable object. Optionally, the payload can be configured to interact with the environment or a target. For example, the payload can include a tool, instrument, or mechanism capable of manipulating objects, such as a robotic arm.

Optionally, the load may include a carrier. The carrier can be provided for the payload and the payload can be coupled to the movable object via the carrier, either directly (e.g., directly contacting the movable object) or indirectly (e.g., not contacting the movable object). Conversely, the payload can be mounted on the movable object without requiring a carrier. The payload can be integrally formed with the carrier. Alternatively, the payload can be releasably coupled to the carrier. In some embodiments, the payload can include one or more payload elements, and one or more of the payload elements can be movable relative to the movable object and/or the carrier, as described above.

The carrier can be integrally formed with the movable object. Alternatively, the carrier can be releasably coupled to the movable object. The carrier can be coupled to the movable object directly or indirectly. The carrier can provide support to the payload (e.g., carry at least part of the weight of the payload). The carrier can include a suitable mounting structure (e.g., a gimbal platform) capable of stabilizing and/or directing the movement of the payload. In some embodiments, the carrier can be adapted to control the state of the payload (e.g., position and/or orientation) relative to the movable object. For example, the carrier can be configured to move relative to the movable object (e.g., with respect to one, two, or three degrees of translation and/or one, two, or three degrees of rotation) such that the payload maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target).

In some embodiments, the carrier can be configured to permit movement of the payload relative to the carrier and/or movable object. The movement can be a translation with respect to up to three degrees of freedom (e.g., along one, two, or three axes) or a rotation with respect to up to three degrees of freedom (e.g., about one, two, or three axes), or any suitable combination thereof.

In some instances, the carrier can include a carrier frame assembly and a carrier actuation assembly. The carrier frame assembly can provide structural support to the payload. The carrier frame assembly can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the payload. For example, the carrier actuation assembly can actuate a rotation of one or more carrier frame components about one or more axes of rotation (e.g., roll axis, pitch axis, or yaw axis). The rotation of the one or more carrier frame components can cause a payload to rotate about one or more axes of rotation relative to the movable object. Alternatively or in combination, the carrier actuation assembly can actuate a translation of one or more carrier frame components along one or more axes of translation, and thereby produce a translation of the payload along one or more corresponding axes relative to the movable object.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 10:
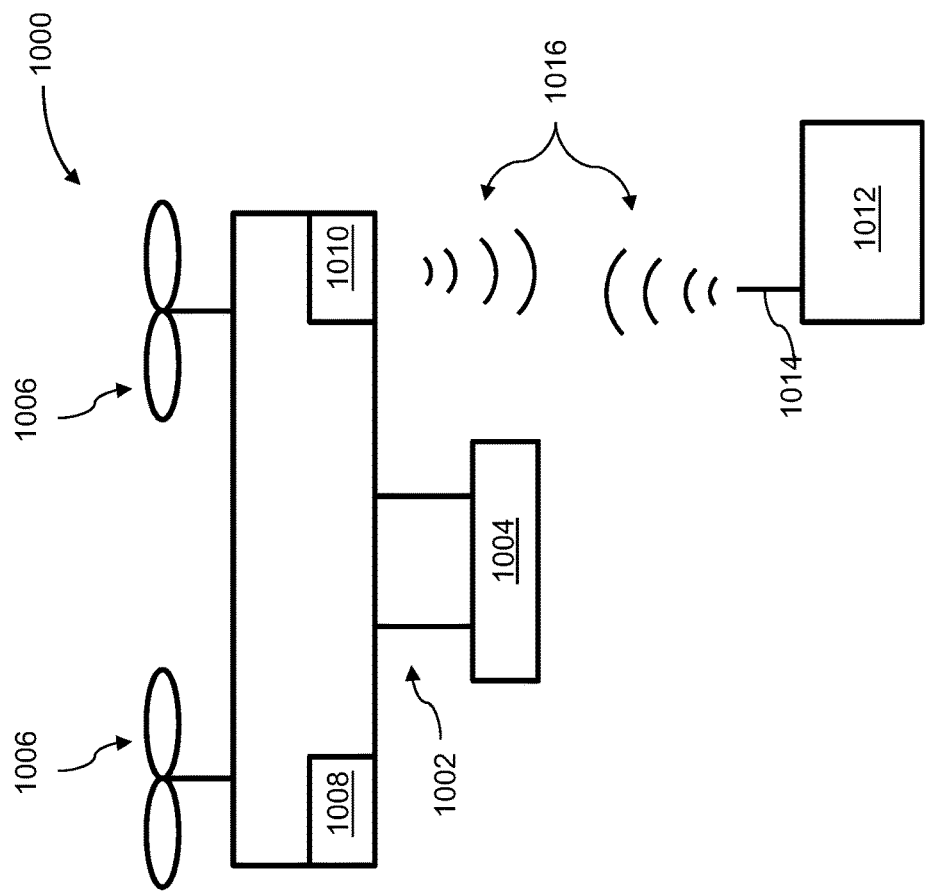
FIG. 10 is a schematic diagram of a system for controlling a movable object, in accordance with embodiments of the invention.

FIG. 10 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. For example, the propulsion mechanisms 1006 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 11:
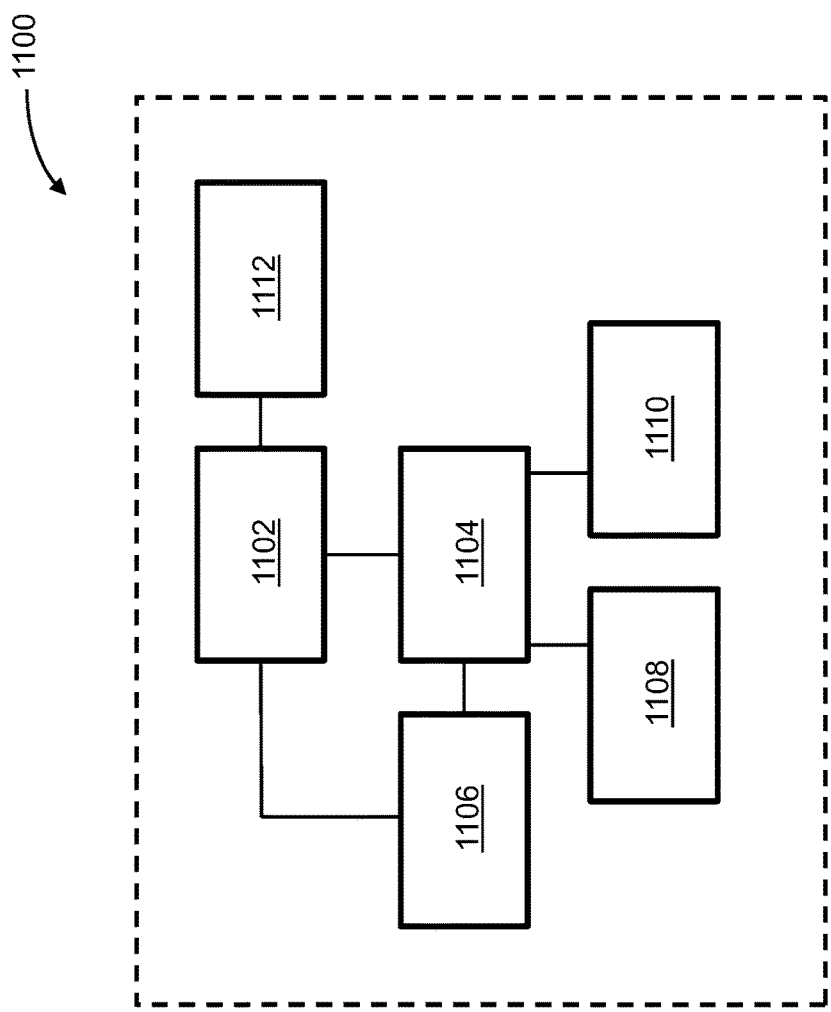
FIG. 11 illustrates a system for controlling a movable object, in accordance with embodiments of the invention.

FIG. 11 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 11 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An unmanned aerial vehicle (UAV) comprising:
   a central body;
   a plurality of arms extending from the central body, each arm of said plurality supporting one or more propulsion units,
   wherein at least one arm of the plurality of arms includes a landing gear portion distal to the central body and is configured to, in response to operation of the one or more propulsion units, transform between:
      a flight configuration that provides lift while the UAV is in flight, and
      a landing configuration wherein the at least one arm is configured to function as a landing support that bears weight of the UAV while the UAV is not in flight, the landing configuration comprising opening the landing gear portion when the one or more propulsion units reduce an amount of propulsion such that gravity brings the landing gear portion toward the underlying surface.

2. The UAV of claim 1, wherein the flight configuration comprises retracting the landing gear portion away from the underlying surface.

3. The UAV of claim 2, wherein the landing gear portion is retracted with aid of the one or more propulsion units when the one or more propulsion units generate lift to lift the landing gear portion away from the underlying surface.

4. The UAV of claim 3, further comprising a limiting structure that prevents the landing gear portion from exceeding a preset configuration.

5. The UAV of claim 4, wherein the limiting structure comprises a torsional spring configured to provide a bias force for the landing gear portion.

6. The UAV of claim 1, wherein a distal end of the at least one arm has a greater area than a cross-sectional area of the at least one arm where the one or more propulsion units are supported.

7. The UAV of claim 1, wherein the at least one arm comprises an auxiliary support extending substantially perpendicular from a distal end of the at least one arm, and wherein the auxiliary support is configured to contact the underlying surface of the UAV in a substantially parallel manner while the UAV is not in flight.

8. The UAV of claim 7, wherein the auxiliary support comprises an extension disposed at the distal end on a side opposing the one or more propulsion units.

9. The UAV of claim 8, wherein the extension is configured to avoid running into another object when the at least one arm is automatically transforming while the UAV is landing.

10. The UAV of claim 7, wherein the auxiliary support comprises an extension disposed at the distal end on a side adjacent to the one or more propulsion units, and wherein the extension is configured to protect the one or more propulsion units.

11. The UAV of claim 1, wherein the one or more propulsion units include one or more rotor blades and an adjustment of a speed of rotation of the one or more rotor blades affects whether the at least one arm is in the flight configuration or the landing configuration.

12. The UAV of claim 1, further comprising a payload supported by the central body.

13. The UAV of claim 12, wherein the payload is supported by the central body with aid of a carrier that permits change in orientation of the payload relative to the central body.

14. The UAV of claim 1, wherein the at least one arm comprises a first section and a second section coupled to one another via a joint, and wherein the first section is configured to change orientation relative to the second section at the joint with aid of the one or more propulsion units.

15. The UAV of claim 14, wherein the one or more propulsion units are configured to respond to a signal generated on a flight controller of the UAV.

16. The UAV of claim 15, wherein the signal is generated on the flight controller of the UAV in response to a command from a user terminal remote to the UAV or in response to a signal from one or more sensors on-board the UAV.

17. A method for unmanned aerial vehicle (UAV) operation, said method comprising:
supporting one or more propulsion units on each of a plurality of arms extending from a central body; and
transforming, in response to operation of the one or more propulsion units, at least one arm of the plurality of arms that includes a landing gear portion distal to the central body between:
a flight configuration that provides lift while the UAV is in flight, and
a landing configuration wherein the at least one arm is configured to function as a landing support that bears weight of the UAV while the UAV is not in flight, the landing configuration comprising opening the landing gear portion when the one or more propulsion units reduce an amount of propulsion such that gravity brings the landing gear portion toward the underlying surface.

* * * * *